United States Patent
Moore et al.

(10) Patent No.: US 9,170,122 B2
(45) Date of Patent: Oct. 27, 2015

(54) DIRECTION LIST

(71) Applicant: Apple Inc., Cupertino, CA (US)

(72) Inventors: Bradford A. Moore, San Francisco, CA (US); Scott Lopatin, San Francisco, CA (US); Marcel van Os, San Francisco, CA (US); Woo-Ram Lee, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/056,403

(22) Filed: Oct. 17, 2013

(65) Prior Publication Data

US 2014/0365118 A1 Dec. 11, 2014

Related U.S. Application Data

(60) Provisional application No. 61/832,905, filed on Jun. 9, 2013.

(51) Int. Cl.
*G01C 21/12* (2006.01)
*G09G 5/00* (2006.01)
*G01C 21/36* (2006.01)

(52) U.S. Cl.
CPC .................................. *G01C 21/3632* (2013.01)

(58) Field of Classification Search
CPC .................................................. G01C 21/3632
USPC .......................................... 701/491; 345/661
See application file for complete search history.

(56) References Cited

U.S. PATENT DOCUMENTS

| | | | |
|---|---|---|---|
| 4,914,605 A | 4/1990 | Loughmiller, Jr. et al. |
| 5,629,854 A | 5/1997 | Schulte |
| 5,654,892 A | 8/1997 | Fujii et al. |
| 6,321,158 B1 | 11/2001 | DeLorme et al. |
| 6,693,564 B2 | 2/2004 | Niitsuma |
| 7,480,565 B2 | 1/2009 | Ikeuchi et al. |
| 7,698,063 B2 | 4/2010 | Kim |
| 8,355,862 B2 | 1/2013 | Matas et al. |

(Continued)

FOREIGN PATENT DOCUMENTS

| | | |
|---|---|---|
| DE | 102008036748 | 10/2009 |
| EP | 1626250 | 2/2006 |

(Continued)

OTHER PUBLICATIONS

Author Unknown, "Android 2.3.4 User's Guide", May 20, 2011, pp. 1-384, Google.

(Continued)

*Primary Examiner* — Thomas G Black
*Assistant Examiner* — Tyler Paige
(74) *Attorney, Agent, or Firm* — Adeli LLP

(57) ABSTRACT

A mobile device that displays a list of traveling maneuvers or driving directions according to a route from a start location to a destination location is provided. The displayed list of driving directions includes a series of graphical items that each corresponds to a maneuver in the route. The displayed list of driving directions is updated dynamically according to the current position of the mobile device. Each maneuver actually taken or traveled causes the mobile device to display the item that corresponds to the taken maneuver differently. After a number of maneuvers have been taken, the graphical items that correspond to the taken maneuvers are removed from display and new maneuvers are brought into view.

22 Claims, 25 Drawing Sheets

(56) References Cited

U.S. PATENT DOCUMENTS

| | | |
|---|---|---|
| 8,464,182 B2 | 6/2013 | Blumenberg et al. |
| 8,589,075 B1 | 11/2013 | Jones |
| 8,606,516 B2 | 12/2013 | Vertelney et al. |
| 8,607,167 B2 | 12/2013 | Matas et al. |
| 8,612,151 B2 | 12/2013 | Winkler et al. |
| 8,639,654 B2 | 1/2014 | Vervaet et al. |
| 8,681,181 B2* | 3/2014 | Arrasvuori ............ 345/661 |
| 8,826,182 B2* | 9/2014 | Arrasvuori ............ 715/836 |
| 2004/0024524 A1 | 2/2004 | Miyazawa |
| 2005/0049786 A1 | 3/2005 | Odachi et al. |
| 2005/0273251 A1* | 12/2005 | Nix et al. ............ 701/201 |
| 2005/0273252 A1* | 12/2005 | Nix et al. ............ 701/201 |
| 2006/0041372 A1 | 2/2006 | Kubota et al. |
| 2006/0217879 A1 | 9/2006 | Ikeuchi et al. |
| 2007/0150179 A1 | 6/2007 | Pinkus et al. |
| 2007/0276597 A1 | 11/2007 | Kato et al. |
| 2008/0316216 A1* | 12/2008 | Bakalash et al. ............ 345/505 |
| 2009/0005981 A1* | 1/2009 | Forstall et al. ............ 701/211 |
| 2009/0037094 A1 | 2/2009 | Schmidt |
| 2009/0063041 A1 | 3/2009 | Hirose et al. |
| 2009/0154666 A1* | 6/2009 | Rios et al. ............ 379/88.18 |
| 2009/0171561 A1 | 7/2009 | Geelen |
| 2009/0171575 A1 | 7/2009 | Kim et al. |
| 2009/0171578 A1 | 7/2009 | Kim et al. |
| 2009/0187335 A1 | 7/2009 | Muhlfelder et al. |
| 2010/0045704 A1 | 2/2010 | Kim |
| 2010/0153010 A1 | 6/2010 | Huang |
| 2011/0016025 A1* | 1/2011 | Gaisford ............ 705/27.1 |
| 2011/0285717 A1 | 11/2011 | Schmidt et al. |
| 2012/0041674 A1 | 2/2012 | Katzer |
| 2012/0290972 A1* | 11/2012 | Yook et al. ............ 715/800 |
| 2012/0303263 A1 | 11/2012 | Alam et al. |
| 2012/0303274 A1* | 11/2012 | Su et al. ............ 701/533 |
| 2013/0050269 A1* | 2/2013 | Arrasvuori ............ 345/661 |
| 2013/0191020 A1 | 7/2013 | Emani et al. |
| 2013/0325339 A1 | 12/2013 | McCarthy |
| 2013/0325342 A1 | 12/2013 | Pylappan et al. |
| 2013/0328861 A1 | 12/2013 | Arikan et al. |
| 2013/0328915 A1 | 12/2013 | Arikan et al. |
| 2013/0328916 A1 | 12/2013 | Arikan et al. |
| 2013/0328924 A1 | 12/2013 | Arikan et al. |

FOREIGN PATENT DOCUMENTS

| | | |
|---|---|---|
| EP | 2080985 | 7/2009 |
| EP | 2672223 | 12/2013 |
| EP | 2672225 | 12/2013 |
| EP | 2672226 | 12/2013 |
| WO | WO 86/02764 | 5/1986 |
| WO | WO 2007/101711 | 9/2007 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |
| WO | WO 2013/184450 | 12/2013 |

OTHER PUBLICATIONS

Author Unknown, "GARMIN. nüvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 page, available at http://www.youtube.com/watch?v=v2aRkLkLT3s.

\* cited by examiner

DIRECTION LIST

CLAIM OF BENEFIT TO PRIOR APPLICATIONS

This present application claims the benefit of U.S. Provisional Patent Application 61/832,905, filed Jun. 9, 2013. U.S. Provisional Patent Applications 61/832,905 is incorporated herein by reference.

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). In addition to presenting two-dimensional (2D) maps or three-dimensional (3D) maps, these applications generally have the capability of computing, when given a starting location and a destination location, one or more routes. Such a route generally consists of a number of driving directions or traffic maneuvers that a driver or a traveler can follow in order to reach the destination. These directions or maneuvers are usually presented graphically within the map (2D or 3D), and/or in a list of directions.

Many mapping applications use both map and list of directions to present the route to the user. Presenting the route in a 2D or 3D map is advantageous because a user can quickly and easily visualize his journey spatially by viewing the map. However, a map is generally not the best setting for presenting all of the necessary information of the route, since these information may clutter the view of the map and visually overload the user. Many mapping applications therefore relay on the list of directions to present all of the necessary information regarding each step or maneuver of the route.

Most mapping applications present the list of directions as a series of textual items. However, these textual items are usually difficult to follow visually, especially when the user of the application is driving while trying to follow the route. Furthermore, the user of the list of directions often finds it difficult to correlate the information on the list of directions with information presented graphically in the map. This is especially problematic for the user of the map, who often needs to turn to the list of directions in order to find out the distances between the various points of interest on the route.

SUMMARY

Some embodiments provide a mobile device that displays a list of traveling maneuvers or driving directions according to a route from a start location to a destination location. The displayed list includes a series of graphical items that each corresponds to a maneuver in the route. The displayed list of driving directions is updated dynamically according to the current position of the mobile device. Each maneuver actually taken or traveled causes the mobile device to display the item that corresponds to the taken maneuver differently. After a number of maneuvers have been taken, the graphical items that correspond to the taken maneuvers are removed from display and new maneuvers are brought into view.

Some embodiments provide a mapping or navigation application that intelligently places distance labels along a route in a map. A distance label placed at a particular position of the route shows the distance to the particular location from the starting point of the route. Distance labels allow the user of the map to quickly appreciate the distances between the various points of interest (e.g., maneuvers) along the route. In some embodiments that display the route as a list of driving directions, the distance labels are placed alongside the list of driving directions, and each distance label is associated with a maneuver in the list of directions.

In some embodiments, individual steps or maneuvers in the list of directions are selectable items in the GUI. The selection of a GUI item that corresponds to a particular maneuver in the list of directions causes the view of the map to move toward a location on the route that corresponds to the particular maneuver. When the user selects a new maneuver from the list of directions, some embodiments animate a transition from a previous view for a previously selected maneuver to a new view for the newly selected maneuver. In some embodiments, the transition includes zooming out to temporarily include both the previously selected maneuver and the newly selected maneuver before zooming in at the newly selected maneuver.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to present traveling directions in a way that is easy for a user to follow while driving, some embodiments provide a mobile device that presents a list of directions that is dynamically updated according to the present position of the mobile device. To aid the user's spatial comprehension of the route, some embodiments present a series of distance labels along the route in the map as well as in a list of directions. And to better integrate the user's understanding of the route from the list of directions and from the route on the map, some embodiments change the view of the map to match the user's selection of a particular item in the list of directions and to animate the change in the view.

Several more detailed embodiments of the invention are described below. Section I describes list of directions that are updated dynamically according to the present position of a mobile device. Section II describes distance labels that are presented along a route in several formats. Section III describes a mapping application that animate changes in view of the map when the user selects a particular item in the list of directions. Section IV describes an electronic system with which some embodiments of the invention are implemented. Section V describes a mapping service environment within which some embodiments of the invention operate.

I. Dynamic Directions

Some embodiments provide a mobile device that displays a list of steps, traveling maneuvers, or driving directions according to a route from a start location to a destination location. The displayed list of includes a series of graphical items that each corresponds to a step or maneuver in the route. The displayed list of driving directions is updated dynamically according to the current position of the mobile device (or the position of the vehicle or person carrying the device). Each maneuver actually taken or traveled causes the mobile device to display the item that corresponds to the taken maneuver differently (e.g., in a different color). After a number of maneuvers have been taken, the graphical items that correspond to the taken maneuvers are removed from display and new maneuvers are brought into view.

Figure 1:
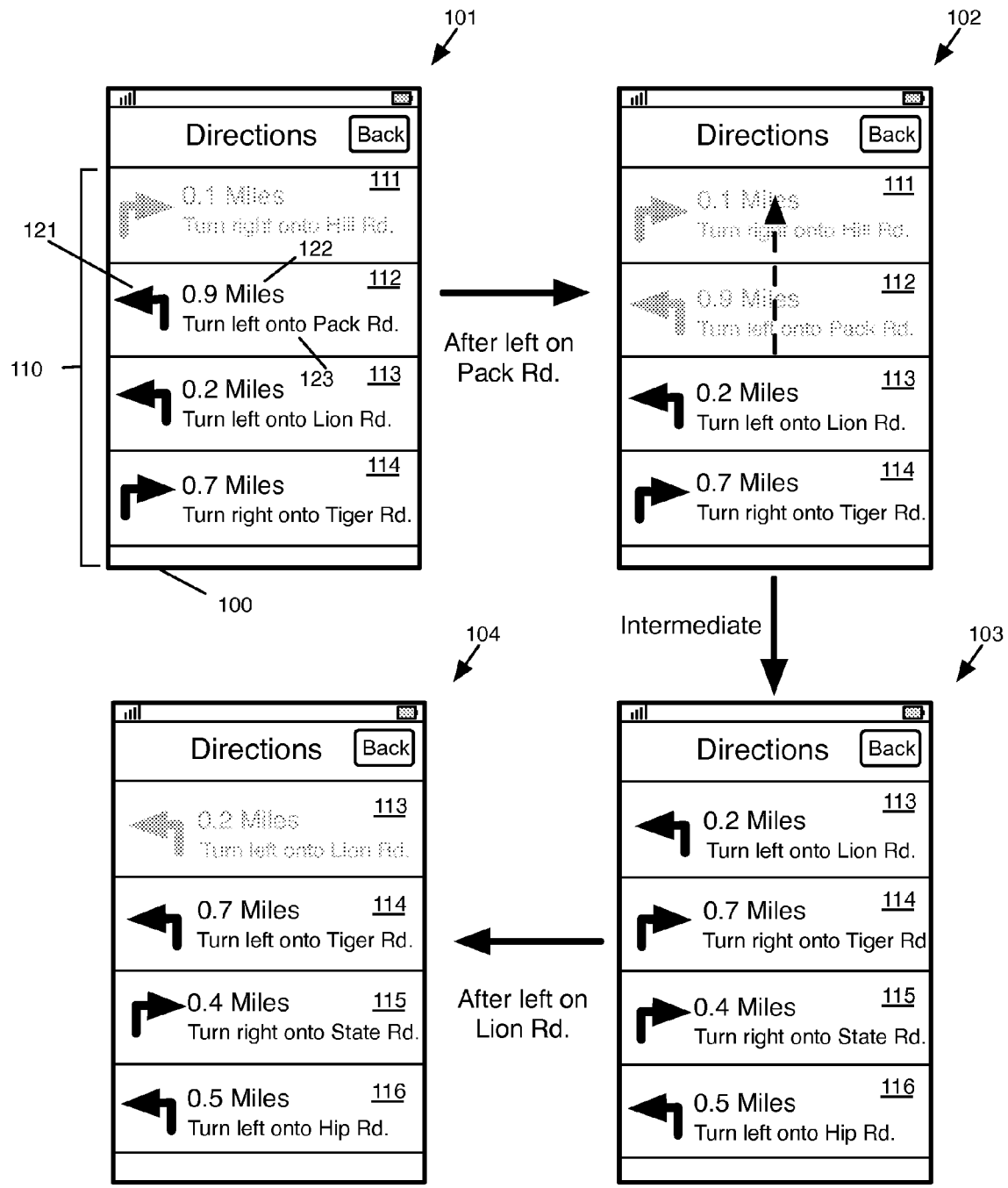
FIG. 1 illustrates a user interface for a mobile device that displays a list of directions.

For some embodiments, FIG. 1 illustrates a user interface for a mobile device 100 that displays a list of directions 110. The list of directions 110 is a set of instructions for taking a traveler from a point of origin (or a starting location) to a point of destination (or an ending location) on a suggested route. The list of directions 110 includes a list of entries, each entry corresponding to a direction, instruction or a maneuver for the traveler to follow according to the route. A traveler is a person or a vehicle traveling on the road whose position is used as the current position for the mapping or navigation application. In some embodiments, the traveler is carrying the mobile device 100 and thus the current position of the mobile device is the current position of the traveler. A maneuver in the list of directions in some embodiments can be a traffic turn, entrance into a freeway, continuing on a freeway, exit from a freeway, departure from the point of origin, arrival at the point of destination, or other actions that a driver or a traveler needs to take in order to follow the route to the destination.

In some embodiments, the display of the list of directions is controlled by a route inspection engine that automatically steps through items in the list of directions when position indication functionality of the mobile device is activated. The mobile device 100 in some of these embodiments is able to determine its own position and then uses that position to dynamically update the display of the list of directions 110. In some embodiments, the mobile device 100 automatically scrolls through individual entries of the list of directions according to its own instantaneous actual location (and hence actual location of the traveler carrying the mobile device).

The mobile device 100 can be any mobile computing and communication devices such as mobile phones, hand-held navigation devices, laptops, or PDAs. It is a device capable of determining its own location and relaying that information to an application running on the device. In some embodiments, the mobile device 100 is equipped with global positioning system (GPS) capabilities for determining its own position. In some embodiments, the mobile device 100 runs applications that use the location information of the mobile device to perform turn-by-turn navigation or mapping operations. In some embodiments, the mobile device acts as a client device to a mapping service and receives mapping information and other mapping related data from the mapping service.

FIG. 1 illustrates the dynamic display of the list of directions 110 by the mobile device 100 in four stages 101-104. At the first stage 101, the mobile device 100 is displaying graphical items 111-114, which graphically represent four entries in the list of directions 110. The mobile device 100 is configured to display at most four maneuvers at a time, even though the list of directions 110 can include more than four entries.

Except for the first entry, each entry in the list of directions 110 describes a maneuver that is to be performed some distance after a previous maneuver. For example, the maneuver (represented by graphical item) 114 is to be performed 0.7 miles after the maneuver 113, the maneuver 113 is to be performed 0.2 miles after maneuver 112, the maneuver 112 is to be performed 0.9 miles after the maneuver 111, and the maneuver 111 is to be performed 0.1 miles after a previous maneuver that is not being displayed. Each maneuver entry in the list of directions therefore also represents a segment of the route that is between the previous maneuver and the maneuver associated with the entry. For example, the graphical item 113 represents a segment of the route between the maneuver 112 "turn left onto Pack Road" and the maneuver 113 "turn left onto Lion Road", and that the length of the segment is 0.2 miles.

Each of the graphical items 111-114 displays information for its associated maneuver. In some embodiments, the information is presented via a set of indicators. For example, the graphical item 112 includes a graphical direction indicator 121, a distance indicator 122, and a detailed description 123 for the maneuver "Turn Left onto Pack Road". The graphical direction indicator 121 is a prominent visual cue of the maneuver, in this case an arrow pointing to the left to indicate a left turn. The detailed description 123 is a textual description of the maneuver that provides the type of the maneuver (left turn) as well as the location of the maneuver (Pack Road). The distance indicator 122 is a distance measurement based on the position of the maneuver. In some embodiments, this is a distance measurement from the previous maneuver (i.e., the distance from the maneuver of 111 to the maneuver of 112). One of ordinary skill would understand that different embodiments present the information for the maneuvers differently. For example, some embodiments include an expected time to travel indicator in the graphical item, the expected time to travel being based on a predicted traveling speed.

Some embodiments visually distinguish graphical items that correspond to completed maneuvers from those that are yet to be taken by the mobile device. In some embodiments, a graphical item that corresponds to a completed maneuver remains in the display of the mobile device, but in a visually less prominent way. As illustrated, the graphical item 111 has been grayed-out while the graphical items 112-114 remain in black, indicating that the traveler carrying the mobile device has completed the maneuver 111 but not maneuvers 112-114. Based on the differential appearances of the graphical items, the user of the device would understand that the traveler has made the right turn onto Hill Road (111), and a left turn onto Pack Road (112) is coming up next. In other words, the graphical item 112, being the first graphical item that has not been grayed-out, corresponds to a segment of the route that the traveler carrying the mobile device is currently traveling on. In some embodiments, a graphical item that corresponds to the immediately upcoming maneuver (such as 112) would further include an indicator (not illustrated) for indicating the distance between the current position of the mobile device and the upcoming maneuver.

At the second stage 102, the traveler carrying the mobile device has completed another maneuver, namely, the left turn on Pack Road associated with the graphical item 112. The mobile device has in turn received updated position information (e.g., GPS coordinates) about the traveler to know that the traveler has completed the left turn on Pack Road. As a result, the mobile device grays out the graphical item 112. At this stage, both graphical items 111 and 112 have been grayed-out to indicate that both of these maneuvers have been completed, and are hence obsolete.

The dashed arrow in stage 102 is for illustrating that the mobile device is in the process of updating or refreshing the display by removing the obsolete maneuvers to make room for new maneuvers from the list of directions 110. In some embodiments, the display update is accomplished by scrolling the list of directions 110 such that the grayed-out items 111 and 112 are scrolled off the display while the new graphical items 115 and 116 are scrolled into the display. Some embodiments animate this process of updating the display by gradually scrolling the list of directions 110, or by fading-out obsolete items and fading-in new items from the list of directions 110.

At the third stage 103, the mobile device has completed the process of updating its display of the list of directions 110 to remove the graphical items 111-112 and to include the new graphical items 115 and 116, which correspond to maneuvers that immediately follow the maneuver 114. Since the obsolete graphical items have been removed, none of the displayed maneuvers are grayed-out. The user of the mobile device would therefore understand that the first displayed maneuver, i.e., the graphical item 113 "turn left onto Lion Road", corresponds to the immediate upcoming maneuver. Some embodiments display the item for the upcoming maneuver in a different, more conspicuous manner than other items in the list of directions.

At the fourth stage 104, the traveler carrying the mobile device has completed the upcoming maneuver, namely, the left turn on Lion Road associated with the graphical item 113. The mobile device in turn grays out the graphical item 113 to indicate that the traveler has completed the maneuver.

In the example illustrated by FIG. 1, the mobile device allows its display to accumulate two obsolete maneuvers (e.g., graphical items 111 and 112 in stage 102) before refreshing the display by removing or scrolling off all of the obsolete maneuvers. Different embodiments handle the display refresh of the list of directions differently. In some embodiments, the mobile device refreshes the display (by e.g., removing or scrolling off the maneuvers that have already been taken) when there is at least one obsolete maneuver in the list of directions. In some embodiments, the mobile device accumulates three or more obsolete maneuvers before refreshing. In some embodiments, the mobile device refreshes its display by removing only some but not all of the obsolete maneuvers. For example, in some embodiments, the mobile device going from stage 102 to 103 removes only the maneuver 111 but leaves maneuver 112 in the display, even though both maneuvers 111 and 112 have become obsolete. In some embodiments, the mobile device allows each obsolete maneuver to stay in the list of directions for a predetermined amount of time before removal so that the change in appearance (e.g., gray-out) of the graphical item that corresponds to the taken maneuver is observable by the user. In some of these embodiments, the timing for the removal of the obsolete maneuvers is independent of how many obsolete maneuvers are in the list of directions.

As mentioned, the list of directions 110 is a set of instructions for taking a traveler from a point of origin to a point of destination on a suggested route. In some embodiments, the list of directions is created by a mapping or navigation application that determines one or more routes from the point of origin to the point of destination and then generates the list of directions based on one of the determined routes. The mapping or navigation application can be an application running on a mobile device that is being carried by the traveler, which then displays the generated list of directions dynamically based on the position of the traveler carrying the mobile device. The mapping or navigation application can also be an application running on a computing device that is not being carried by the traveler, but nevertheless is capable of computing a route and generating a list of directions for the traveler.

Figure 2:
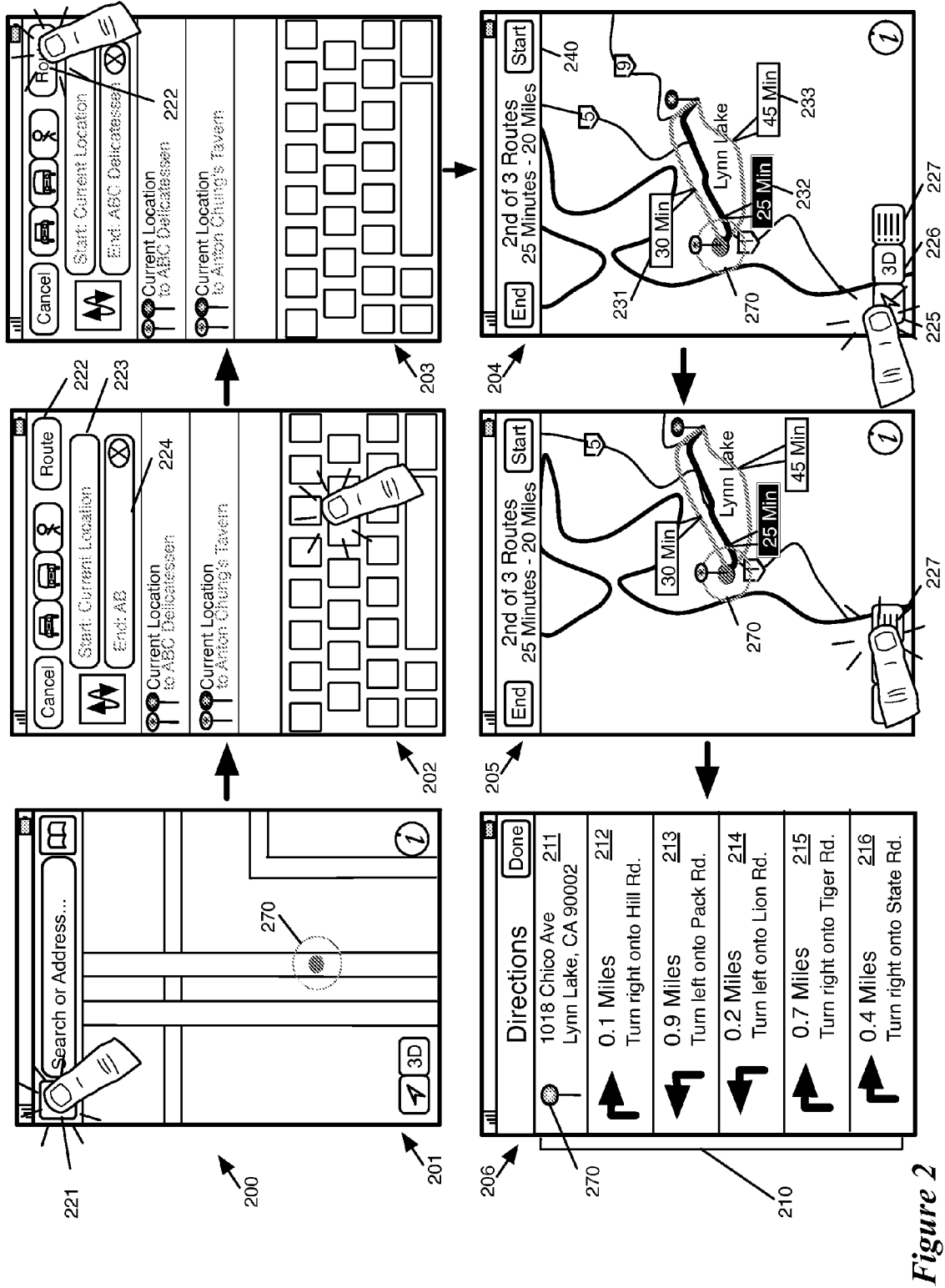
FIG. 2 illustrates the creation of a list of directions by a mapping application running on a mobile device.

For some embodiments, FIG. 2 illustrates the creation of a list of directions by a mapping application running on a mobile device 200. The mapping application allows the user to enter a start location and an end location, computes one or more routes, then generates a list of directions 210 based on a route that can take a traveler from the start location to the end location. The generation of the list of directions is illustrated in six stages 201-206.

The first stage 201 illustrates the launch of an operation to generate a list of directions. The mobile device 200 is executing a mapping application that graphically illustrates the current position 270 of the mobile device (and the traveler carrying the mobile device). The position is provided by the positioning capability of the mobile device 200. The stage 201 also shows the user selecting an UI item 221 for launching a facility for computing routes.

At the second stage 202, the selection of the UI item 221 has caused the mapping application to provide an interface to allow the user to enter a starting location at an UI item 223 and an ending location at an UI item 224. The user is using the provided interface to enter an ending location for the route while letting the starting location to default to the current position of the mobile device.

At the third stage 203, the user has completed entering the start and end locations of the route and is selecting a UI item 222, which causes the mobile device 200 to compute one or more routes based on the start and end locations entered by the user.

At the fourth stage 204, the mapping application has finished the route computation and provided three routes 231-233 that can take a traveler from the starting location to the end location. The mapping application in turn shows a map at a zoom level that allows all three routes 231-233 to be viewed in their entirety. The route 232 is the fastest of the three routes (25 minutes) and is selected by default. The route 232 appears highlighted, and its information is in a banner 240 near the top of the display.

The mapping application at this stage also provides several UI items for activating various map viewing options, such as an UI item 225 for centering the map at the current location, an UI item 226 for showing the map in 3D perspective, and an UI item 227 for displaying the route as a list (i.e., a list of directions). The fifth stage 205 shows the result of when the user selects the UI item 225 to center at the current location 270.

The sixth stage 206 shows the result of when the user selects the UI item 227, which brings up a list of directions 210 for the selected route 232. The list of directions is represented by six UI items 211-216. The item 211 provides the starting point of the route, which is also the current location 270 in this example. The items 212-216 correspond to maneuvers that the traveler should make according to the route 232. The list of directions 210 may have additional maneuvers that are not being displayed, but can be brought into view by scrolling.

Figure 3:
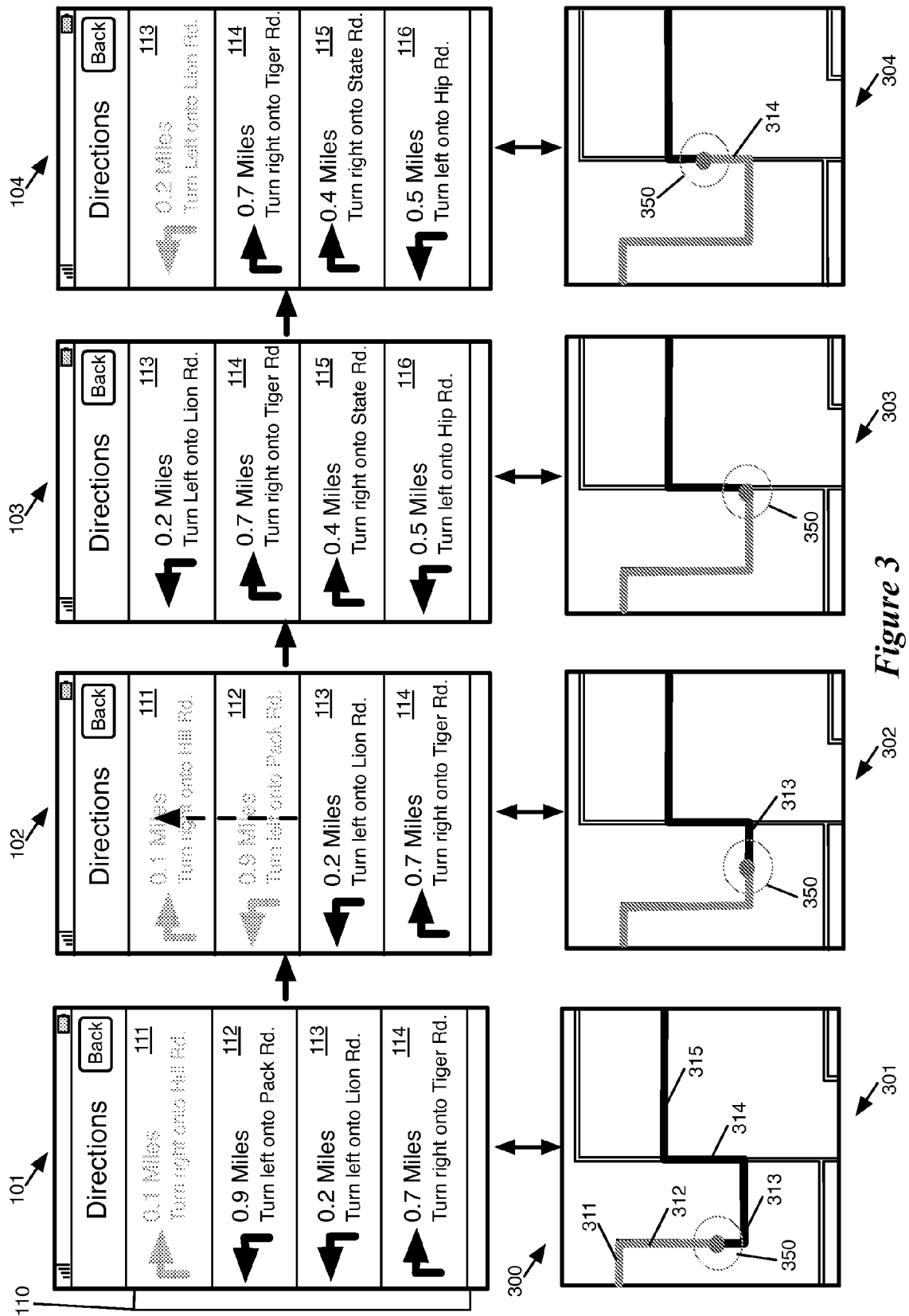
FIG. 3 illustrates the correspondence between the dynamic display of the list of directions in a mobile device and the current position of the mobile device.

As mentioned, some embodiments dynamically display the list of directions such as 110 and 210 according to the current position of the mobile device. The display for the list of directions grays out (or makes less visible) an individual maneuver whenever the traveler carrying the mobile device has completed the maneuver and rendered that maneuver obsolete. Furthermore, some embodiments refresh the display of the list of directions whenever a certain number of displayed maneuvers have become obsolete. FIG. 3 illustrates the correspondence between the dynamic display of the list of directions and the current position of the mobile device (i.e., the vehicle or the person carrying the mobile device). FIG. 3 illustrates the list of directions 110 of FIG. 1 in four stages 301-304, which corresponds to stages 101-104 of FIG. 1. In addition, FIG. 3 illustrates the current position of the mobile device in a two-dimensional (2D) map 300 for each of the four stages. In some embodiments, both the display for the list of directions 110 and the map 300 are available for view by the user of the mobile device 110. Indicator 350 indicates the current position of the mobile device.

The map 300 includes several road sections 311-315, some of which are referred to by items in the list of directions 110. Specifically, the road section 312 correspond to "Hill Road" of the item 111, the road section 313 corresponds to "Pack Road" of the item 112, the road section 314 corresponds to "Lion Road" of the item 113, the road section 315 corresponds to "Tiger Road" of the item 114. The road sections 311-315 are also highlighted, indicating that they are part of the route computed by the mapping application for traveling from the starting location to the ending location.

At the first stage 301, which corresponds to the stage 101, the current position indicator 350 indicates that the traveler carrying the mobile device has performed the maneuver 111 and made the right turn onto Hill Road (the road section 312). The maneuver 111 is at this point obsolete and has been grayed out.

At the second stage 302, which corresponds to the stage 102, the current position indicator 350 indicates that the traveler has performed the maneuver 112 and taken the left turn onto Pack road (road section 313). The maneuver 112 is at this point also obsolete and grayed out. The dashed line in stage 102 indicates that the mobile device is in the process removing the two obsolete maneuvers from display, e.g., by scrolling the list of directions so items 111 and 112 come off the display.

At the third stage 303, which corresponds to the stage 103 the display of the mobile device has completed the removal of the obsolete maneuver items 111-112 from display and added new items 115 and 116 from the list of directions 110. The current position indicator 350 in the map indicates that the mobile device is still on Pack road and approaching Lion road but has yet to perform the maneuver 113 (left turn onto Lion Road). Accordingly, the item 113 has not been grayed-out.

At the fourth stage 304, which corresponds to the stage 104, the current position indicator 350 indicates that the traveler carrying the mobile device has performed the maneuver 113 and taken the left turn onto Lion Road (road section 314). The maneuver 113 is at this point obsolete and grayed out. The mobile device would remove the obsolete maneuver 113 later when, for example, the traveler carrying the mobile device has completed maneuver 114 and made the right turn into Tiger road.

Figure 4:
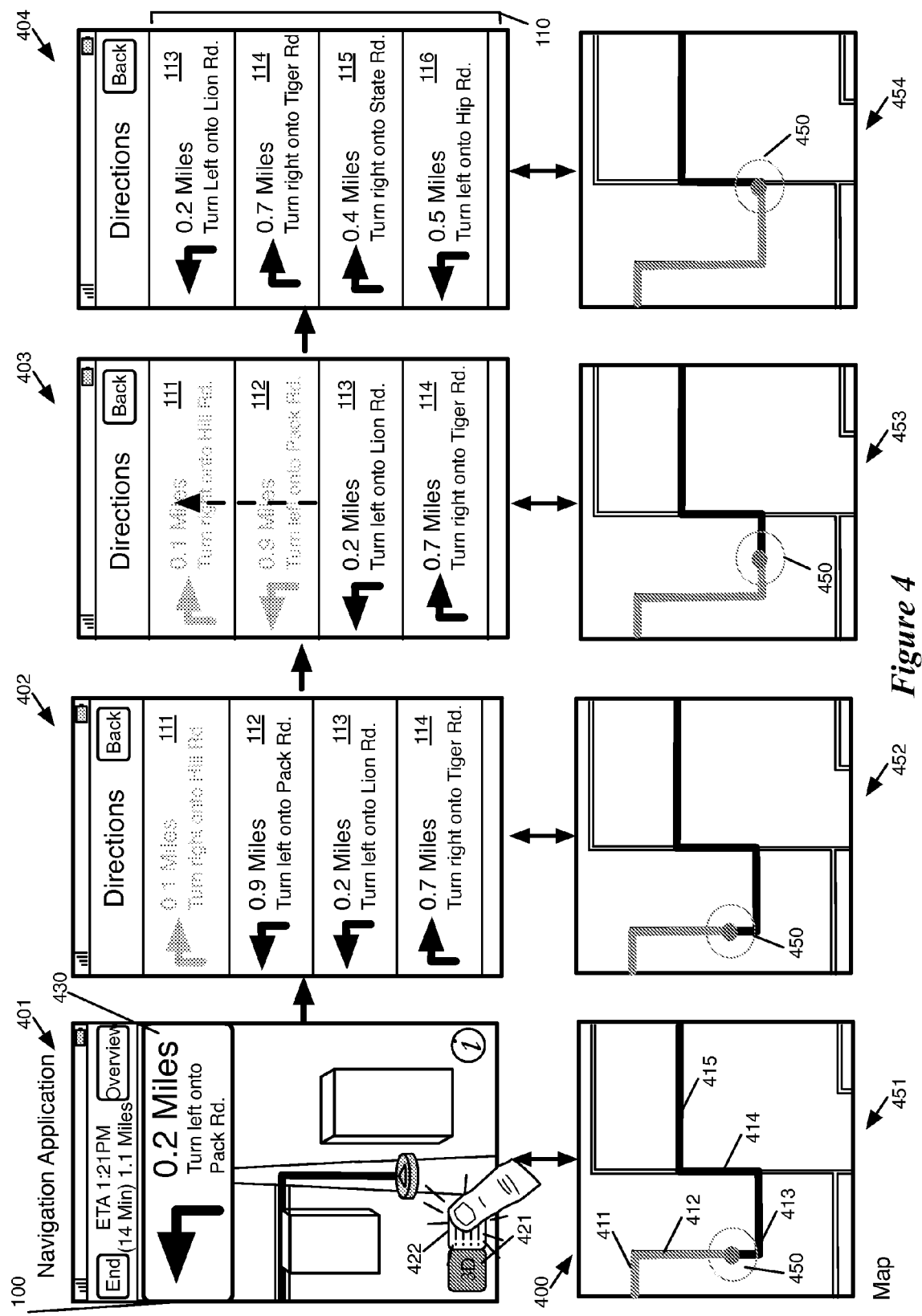
FIG. 4 illustrates the dynamic display of the list of directions during navigation operations by a mobile device.

In some embodiments, the dynamic updating of the list of directions is performed during navigation mode. Specifically, some embodiments dynamically update the list of directions as the mobile device is giving the traveler turn-by-turn instructions according to a route and in response to the current position of the mobile device. In some embodiments, the mobile device in its navigation mode instructs the driver/traveler to make a particular maneuver, and then changes the appearance of the corresponding maneuver item in the list of directions after the mobile device detects that the traveler carrying the mobile device has completed that particular maneuver. FIG. 4 illustrates the dynamic display of the list of directions 110 during navigation operations by the mobile device 100.

FIG. 4 illustrates the display of the mobile device 100 in four stages 401-404. FIG. 4 also illustrates the corresponding 2D map 400 in four stages 451-454. The four map stages 451-454 shows the current positions of the mobile device during the stages 401-404, respectively. The list of directions includes maneuvers 111-116 as in FIGS. 1 and 3.

The map 400 includes several road sections 411-415, some of which are referred to by items in the list of directions 110. Specifically, the road section 412 corresponds to "Hill Road" of the item 111, the road section 413 corresponds to "Pack Road" of the item 112, the road section 414 corresponds to "Lion Road" of the item 113, and the road section 415 corresponds to "Tiger Road" of the item 114. The road sections 411-415 are highlighted, indicating that they are part of the route computed by the mapping application for traveling from the starting location to the ending location.

The first stage 401 shows the mobile device 100 in 3D navigation mode. Specifically, the mobile device 100 is displaying a 3D view of the road from the perspective of the traveler based on his/her current position. Under the navigation mode, the mobile device is giving turn-by-turn instructions to the traveler based on a route that is used to generate the list of directions 110. The mobile device is also displaying a notification 430 for the upcoming maneuver, i.e., making a left turn onto Pack Road in 0.2 miles. The current position indicator 450 in the corresponding map stage 451 indicates that the traveler carrying the mobile device is on Hill Road 412 and approaching Pack Road 413.

The display of the mobile device 100 also provides several UI items such as UI items 421 and 422. The UI item 421 is for bringing up the 3D navigation view (which is highlighted to indicate that the 3D navigation view is already selected as the current view). The UI item 422 is for bringing up a list of directions view. The first stage 401 shows the user selecting the UI item 422.

The second stage 402 shows the mobile device 100 immediately after the user has selected the UI item 422. The display of the mobile has switched to displaying the list of directions 110. The mobile device is displaying maneuver items 111-114 from the list of directions 110. The current position indicator 450 in the corresponding map stage 452 indicates that the traveler carrying the mobile device is on Hill Road 412 and traveling toward Pack Road 413. The mobile device 100 in its navigation mode knows that the traveler carrying the mobile device has already taken the right turn onto Hill Road (i.e., maneuver 111) and that the left turn into Pack Road (i.e., maneuver 112) is coming up next. Consequently, maneuver item 111 is grayed-out but not maneuver item 112.

The third stage 403 shows the mobile device 100 after the traveler carrying the mobile device has performed the maneuver of maneuver item 112. The current position indicator 450 in the corresponding map stage 453 indicates that the traveler carrying the mobile device is on Pack Road 413 and traveling toward Lion Road 414. The mobile device has grayed-out maneuver item 112, because the traveler carrying the mobile device has already performed that maneuver by making the left turn onto Pack Road. Furthermore, the display of the mobile device is in the process of refreshing the display of the list of directions 110 (as indicated by the dashed line) by removing (or scrolling off) obsolete maneuver items 111 and 112 from the display.

The fourth stage 404 shows the mobile device 100 after it has completed the refreshing of the display of the list of directions. As illustrated, maneuver items 111 and 112 have disappeared from view (or scrolled-off), and new maneuver items 115 and 116 are brought into view (or scrolled-in). None of the items appear grayed-out, as the corresponding map stage 454 shows that the current position indicator 450 is approaching Lion Road but has yet to make the left turn (i.e., maneuver 113).

FIG. 4 illustrates an example in which the mobile device in navigation mode updates its display of the list of directions whenever the mobile device detects that the traveler carrying the mobile device has completed a maneuver that corresponds to an item in the list of directions. In some embodiments, the mobile device also changes the appearance of a particular maneuver item in the list of directions as the navigation software is instructing the traveler to perform that particular maneuver.

Figure 5:
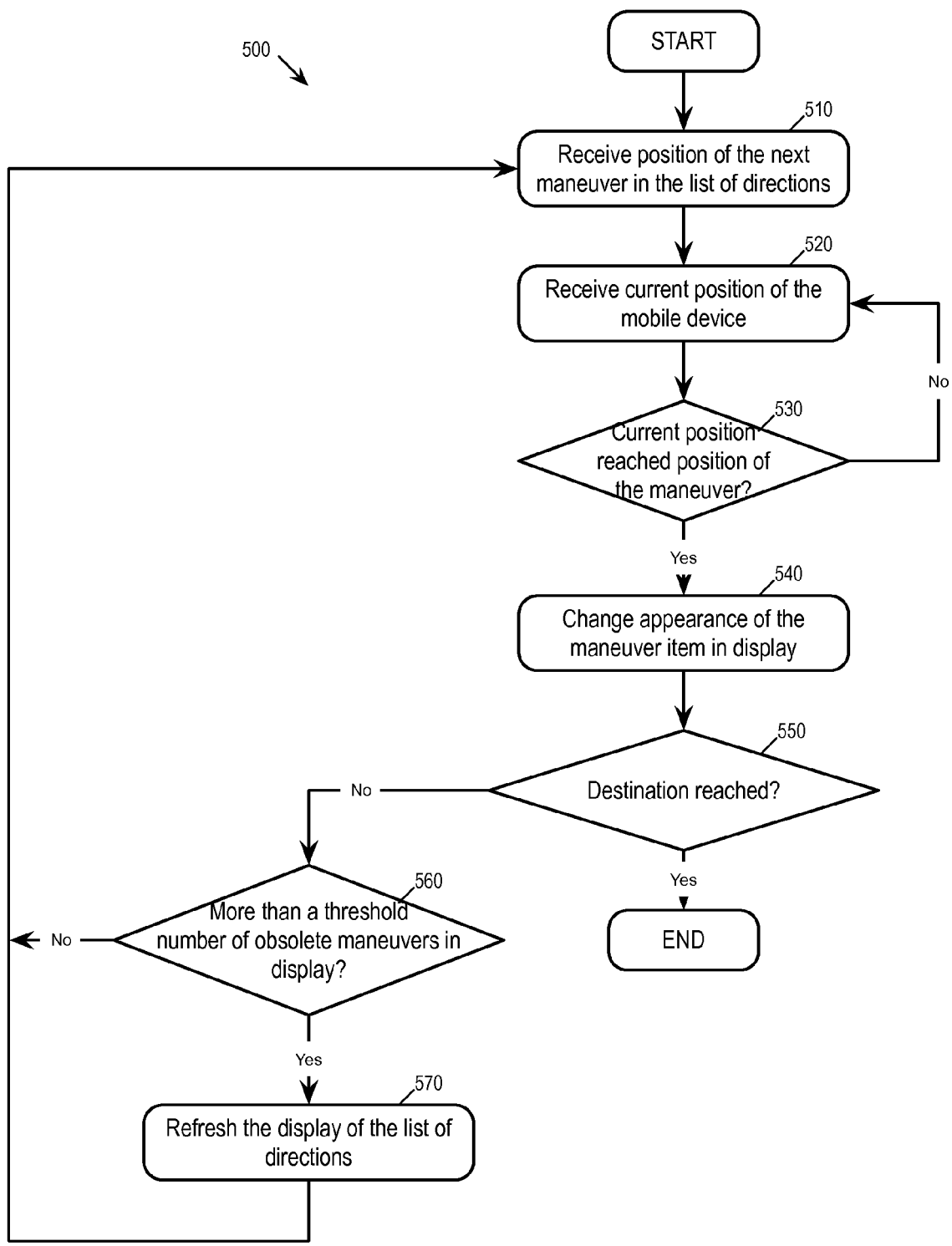
FIG. 5 conceptually illustrates a process for dynamically updating a list of directions.

FIG. 5 conceptually illustrates a process 500 for dynamically updating a list of directions for some embodiments. In some embodiments, the process 500 starts after the mobile device has generated a list of directions or received a list of directions that is generated by another computing device. In some embodiments, the process 500 starts after the list of directions has become available and the mobile device has entered navigation mode.

The process receives (at 510) the position of the next maneuver in the list of directions and receives (at 520) the current position of the mobile device. In some embodiments, each maneuver is associated with a position that can be compared with the current position of the mobile device. In some embodiments, the current position is provided by GPS capabilities within the mobile device. Some embodiments identify the next maneuver in the list of directions as the first maneuver that the traveler carrying the mobile device will reach based on the mobile device's current position and direction.

Next, the process determines (at 530) whether the current position has reached the position of the maneuver. Some embodiments examine the received current position of the mobile device and compare it with the position that is associated with the next maneuver. In some embodiments, the process determines whether the current position of the mobile device is within a certain threshold range of the position of the next maneuver. If the current position of the mobile device indicates that the traveler carrying the mobile device has already reached or passed the position associated with the next maneuver, the process proceeds to 540. If the current position of the mobile device indicates that the traveler carrying the mobile device has yet to reach the position of the maneuver, the process returns to 520 to receive the current position of the mobile device again.

At 540, the process changes the appearance of the obsolete maneuver in the display. As the traveler carrying the mobile device is making his way through the route by performing the maneuvers suggested by the route, some embodiments mark each performed maneuver as having been completed and therefore obsolete. The process then changes the display of the list of directions to inform the user that the maneuver has already been performed. As discussed by reference to FIGS. 1 and 3 above, some embodiments change the appearance of graphical items that are associated with obsolete maneuvers in the list of directions. Some embodiments change the appearance of those obsolete graphical item to make them less conspicuous than other items, such as by graying out.

The process then determines (550) if the destination has been reached. In some embodiments, the last maneuver in the list of directions corresponds to the arrival at the destination point of the route. In some embodiments, if the last maneuver in the list of directions has become obsolete, the process would realize that the mobile device has reached the destination. If the mobile device has not reached the destination, the process proceeds to 560. If the mobile device has reached the destination, the process 500 ends.

The process determines (at 560) whether there are more than a threshold number of obsolete maneuvers in the display. As illustrated in FIGS. 1, 3, and 4, the mobile device refreshes the display of the list of directions whenever two or more maneuver items in the display have been grayed out or marked as obsolete (so the threshold number of obsolete maneuvers is two in those examples). If the number of obsolete maneuver items being displayed is greater than or equal to the threshold number, the process proceeds to 570 to refresh the display in order to remove the obsolete maneuver items from display. Otherwise, the process 500 would not refresh the display and leave the obsolete maneuvers in the display until more maneuvers from the list of directions have been performed.

The process refreshes (at 570) the display of the list of directions such that at least some of the obsolete maneuvers are removed from display and additional maneuvers brought into view. Some embodiments animate the refresh by scrolling the list of directions. Some embodiments animate the refresh by fading-out obsolete items and fading-in new items from the list of directions. After refreshing the display of the list of directions, the process returns to 510.

II. Distance Labels

Some embodiments provide a mapping or navigation application that intelligently places distance labels along a route in a map. A distance label placed at a particular position of the route shows the distance to the particular location from the starting point of the route. Distance labels allow the user of the map to quickly appreciate the distances between the various points of interest (e.g., maneuvers) along the route. In some embodiments that display the route as a list of driving directions, the distance labels are placed alongside the list of driving directions, and each distance label is associated with a maneuver in the list of directions.

Figure 6:
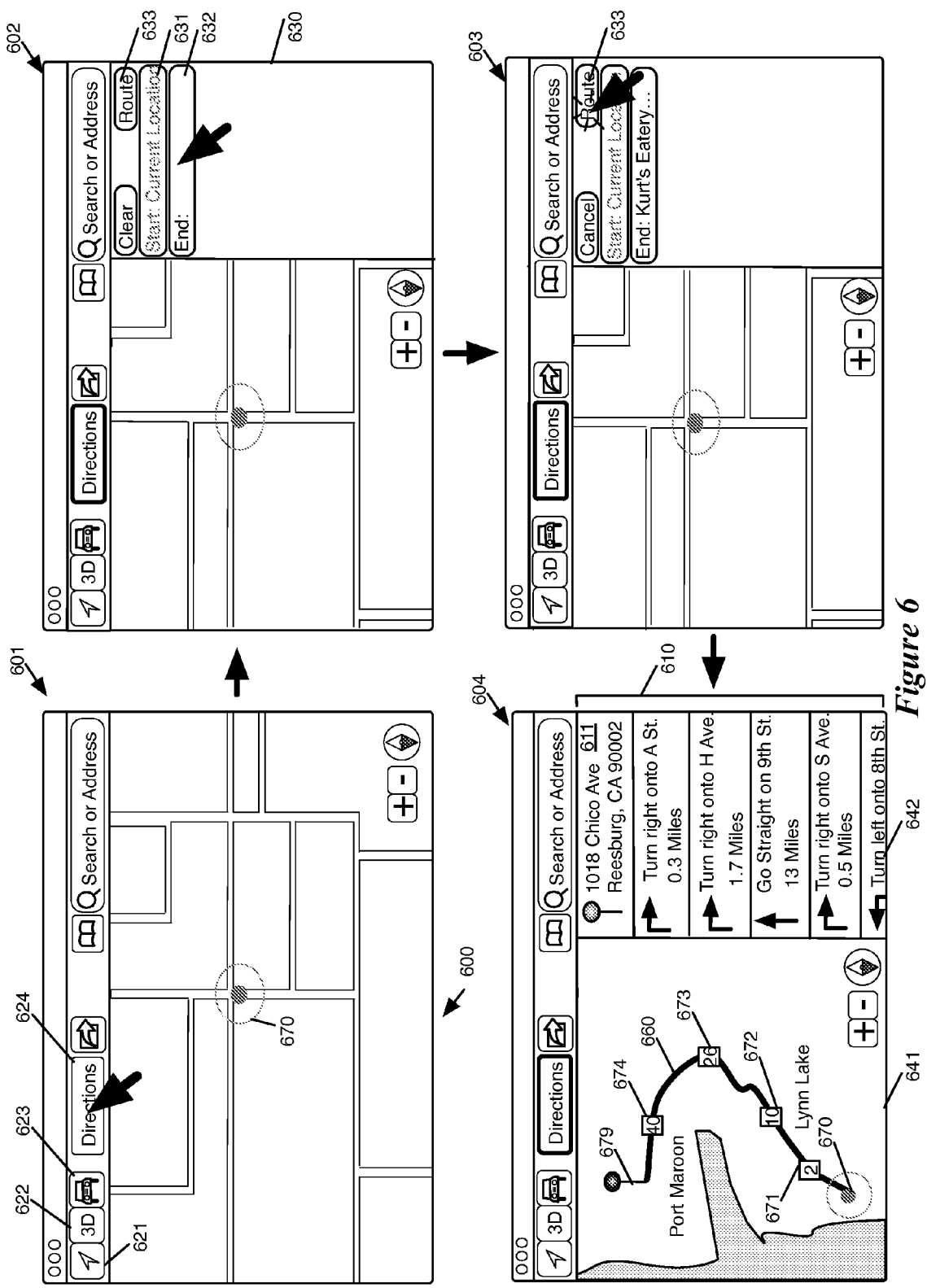
FIG. 6 illustrates the placement of distance labels on a route in a map.

FIG. 6 illustrates the placement of distance labels on a route in a map. The route includes a series of maneuvers that take a traveler from a point of origin to a point of destination, and the distance labels are for identifying the distances from the origin to some of those maneuvers along the route.

In some embodiments, the placement of distance labels is performed by a computing device running a mapping application when it computes the route. In some embodiments, the computing device is a mobile device that is being carried by the traveler and is capable of providing the traveler with dynamic information based on the current position of the mobile device. In some embodiments, the computing device is a device that is not being carried by the traveler, but nevertheless is running a mapping or navigation application that can compute and provide a route and/or a list of directions to the traveler.

FIG. 6 illustrates the placement of the distance labels in four stages 601-604. Each stage shows a graphical user interface (GUI) 600 of a computing device. The GUI 600 is that of a mapping application, which is capable of providing several types of cartographic information, including a list of (driving) directions, maps in 2D view or 3D view, traffic conditions, as well as the current position of the mobile device. The GUI 600 includes an UI item 621 for bringing the current position of the mobile device into view, an UI item 622 for viewing the map in 3D perspective, an UI item 623 for providing traffic condition on the map, and an UI item 624 for creating a route from a starting location to an ending location.

At the first stage 601, the mapping application of the computing device is showing a 2D map that is centered at the current location 670 of the traveler carrying the mobile device. For a mobile computing device that is being carried by the traveler, the current position is provided by positioning capabilities (e.g., GPS) of the mobile device in some embodiments. For a computing device that is not being carried by the traveler, the current position of the "traveler" can be the location of the computing device itself, or a current position of a traveler who sends his positional information to the computing device. The first stage 601 also shows the user (illustrated by a cursor) selecting the UI item 624 in order to activate an interface for entering the starting and ending locations for generating a route.

At the second stage 602, the mapping application is displaying a route generation interface 630 for entering a start location and an ending location. The interface 630 was brought into the GUI 600 by the user's selection of the UI item 624. The interface 630 allows the user to enter the starting location and ending location through items 631 and 632. The interface 630 also has a UI item 633 for generating a route based on the entered starting and ending locations. The user in stage 602 is about to select the ending location item 632 for entering the ending location for the route while leaving the starting location to default to the current location.

At the third stage 603, the user has finished entering the starting and ending locations of the route and is selecting the route generation item 633. Selection of the route generation item 633 causes the mapping application to compute a route from the entered starting location to the entered ending location. The mapping application also generates a list of directions that provides instructions on what maneuvers to perform in order to reach the destination according to the computed route.

The fourth stage 604 shows the result of the route generation operation, in which the mapping application has generated a route 660 for reaching the destination location from the current position and a corresponding list of directions 610. The GUI 600 at this stage shows a 2D map 641 at a zoom level that allows the route 660 to be viewed in its entirety. The GUI 600 also includes a pane 642 for displaying the generated list of directions 610. The first item 611 in the list corresponds to the origin 670 of the route 660. The last item in the list (not in the display) corresponds to the terminus 679 of the route 660.

The 2D map 641 also displays four distance labels 671-674 along the route 660. A distance label at a particular point in the route indicates the distance between the origin 670 of the route and that particular point in the route. For example, the number '2' in the distance label 671 indicates that the label is associated with a point in the route that is 2 miles away from the origin 670, while the number '40' in the distance label 674 indicates that the distance label 674 is associated with a point in the route that is 40 miles away from the origin 670. In some embodiments, the placement of the distance labels in the map is at scale with respect to the distance shown on the label. For example, the length along the route between the origin 670 and the label 673 corresponds to 26 miles according to the scale of the map.

One of ordinary skill would understand that distance labels can be in another unit of length such as kilometers, yards, etc. In some embodiments, a distance label at a particular point of the route displays an expected time of travel to reach that particular point based on predicted traveling speeds along the route. The distance labels in the examples described above are measurements from the start of the route. However, in some embodiments, distance labels are measurements from the end of route (i.e., distance until the destination or expected time of travel to reach the destination, etc.)

Figure 7:
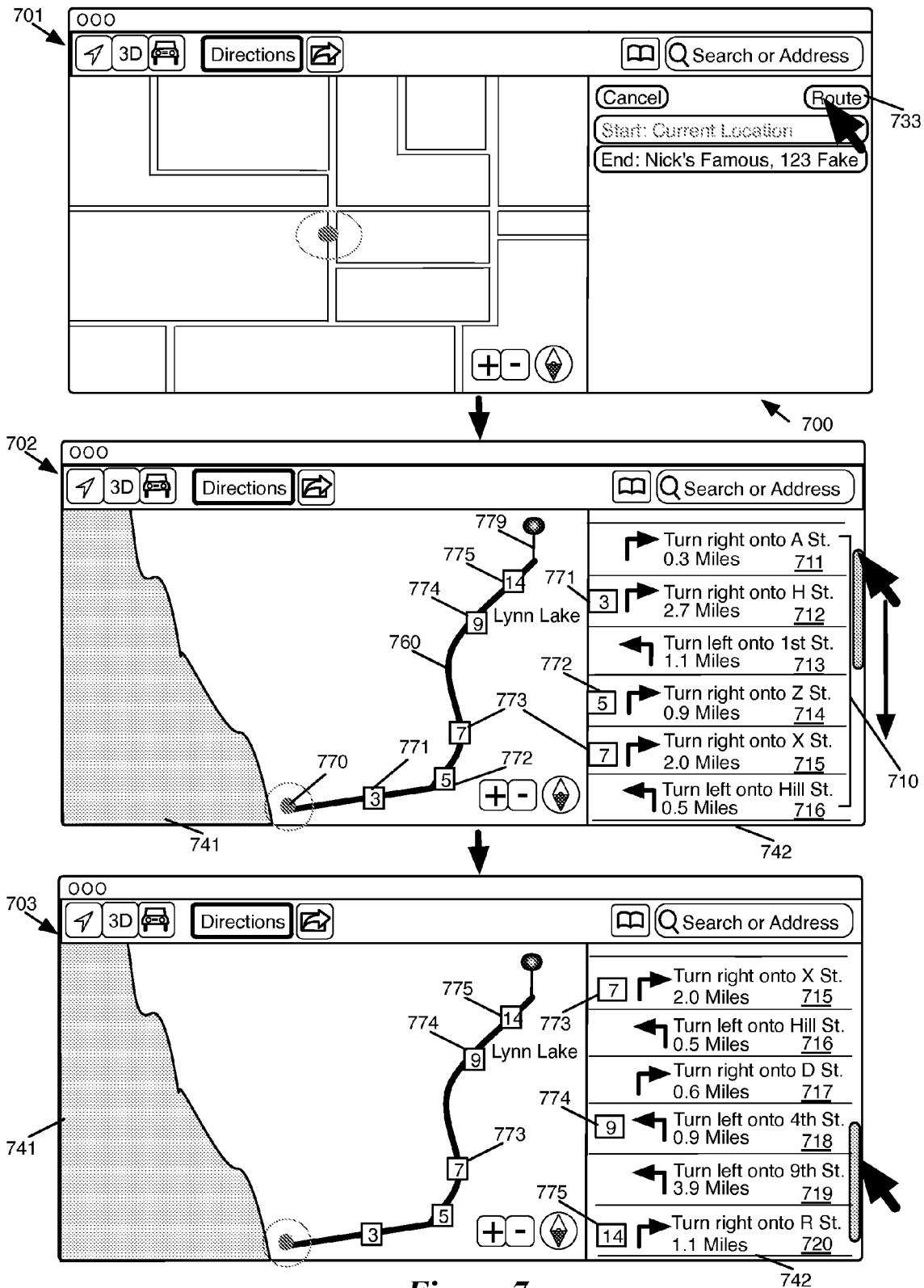
FIG. 7 illustrates distance labels that are placed along a list of directions and along a route in the map.

In addition to placing distance labels on the route in the map window 641, some embodiments place distance labels along the list of directions as well. Specifically, some embodiments place distance labels in individual graphical items of the list of directions. FIG. 7 illustrates distance labels that are placed along a list of directions and along a route in the map. FIG. 7 illustrates the placement of the distance labels along the list of directions in three stages 701-703 of a GUI 700 of a computing device.

The first stage 701 is similar to the stage 603 of FIG. 6, in which the user has finished entering the starting and ending locations of the route and is selecting the route generation item 733, which causes the mapping application to compute a route 760 and generating a list of directions 710 based on the computed route 760.

The second stage 702 is similar to the stage 604 of FIG. 6, in which the GUI 700 displays a map window 741 and a pane 742. The map window 741 shows the route 760 in its entirety and includes five distance labels 771-775 that are placed along the route 760. The pane 742 is for showing the list of directions 710 and includes three of the same five distance labels 771-773 along the list of directions 710. Since the pane 742 is configured to display only six maneuver items at a time, it can only display some of the distance labels. As illustrated, the pane 742 is displaying only items 711-716 of the list of directions, in which the distance label 771 (3 miles) is placed along the item 712, the distance label 772 (5 miles) is displayed along the item 714, and the distance label 773 (7 miles) is displayed along the item 715. However, the GUI 700 allows the scrolling in the pane 742 so other maneuvers in the list of directions (and other distance labels) can be revealed.

The third stage 703 shows the GUI 700 after the user has scrolled the list of directions 710 in the pane 742 to reveal other maneuvers in the list of directions. As illustrated, the user has scrolled the list of directions up such that items 711-714 have been scrolled off the screen and the items 717-720 have been scrolled in. The distance label 774 (9 miles) associated with the maneuver item 718 and the distance label 775 (14 miles) associated with the maneuver item 720 are brought into view by the scrolling operation.

In some embodiments, placing a distance label next to a particular maneuver item in the list of directions means that the maneuver is to occur at or near the position specified by the distance label. For example, placing the label '3' (771) next to the maneuver item 712 means that the maneuver "turn right onto H Street" is to occur at or near 3 miles from the origin of the route 760. As mentioned, in some embodiments, each maneuver item represents a segment of the route between two consecutive maneuvers. In some of these embodiments, a distance label placed next to a maneuver item provides the information on the distance between the origin of the route and the segment of the route represented by the maneuver item. For example, in some embodiments, placing the distance label '5' (772) next to the item 714 informs the user that some point in the segment of the route between the left turn onto 1st street (maneuver item 713) and the right turn on to Z street (maneuver item 714) is 5 miles away from the origin of the route.

In some embodiments, the mapping application places a predetermined number of distance labels on the route from the point of origin to the destination. In some embodiments, this predetermined number is independent of the length of the route. The example of FIG. 6 has only 4 labels placed along the route 660 that is longer than 40 miles, while the example of FIG. 7 has 5 labels placed along the route 760 that is only slightly longer than 14 miles. The choice of the number of labels is not contingent upon the distance of those routes.

The display of distance labels is useful for providing scale information to the user of the mapping application. A user seeing a route in the map with the distance labels would understand the scale of the map without having to consult the conventional linear scale for the map. Thus, some embodiments refer to the distance labels as distance scales. Furthermore, since a route is rarely if ever a straight line that can be easily compared with a straight scale, having distance labels allows the user to easily appreciate the actual distances between different points of interest in a not-so-straight route.

Different embodiments place distance labels along the route according to different criteria. In some embodiments, the distance labels are distributed uniformly distance wise throughout the entire route regardless of the positions or steps in the list of directions. Some embodiments place distance labels at positions along the route whose distance measures are multiples of a "nice round number" (such as 500 m, 1.5 km, 2.5 miles, etc.). In some embodiments, a "nice round number" is a number with at most two significant non-zero digits, and each of these two non-zero digits is 1, 2, or 5. This "nice round number" is a number that typically serves as the unit of a scale that runs along the bottom of the map. The distance labels therefore effectively turn the route into a map scale that has multiple segments, each segment representing a unit of the scale having a length that is the "nice round number". (Of course, a conventional map scale is straight, while a "map scale" that is formed by distance labels along a route is one that can have turns and curves).

In some embodiments, this "nice round number", (i.e., the length of a segment that is a unit of the scale) is referred to as a "segment unit value". A segment unit value provides a distance value that the segment represents on the map. For example, in a metric system, a segment unit value may be 5 meters, 10 meters, 100 meters, 1 km, 5 km, etc. In a U.S. customary system, a segment unit value maybe 1 feet, 5 feet, 100 feet, 1000 feet, 1 mile, 5 miles, 10 miles, etc.

In order to determine the placement of distance labels, some embodiments determine other parameters based on the segment unit value. Some embodiments compute a segment display length, which is the length of the segment as displayed on the screen of the device (e.g., between 0.5-2.0 cm on the screen). This length is determined from the segment unit length based on the scale of the map at the current zoom level. Some embodiments compute a number of segments, which determines the number of distance labels to display along the route. In some embodiments, the mapping application may divide the route up to five segments (i.e., having up to four distance labels) regardless of the actual length of the route.

Figure 8:
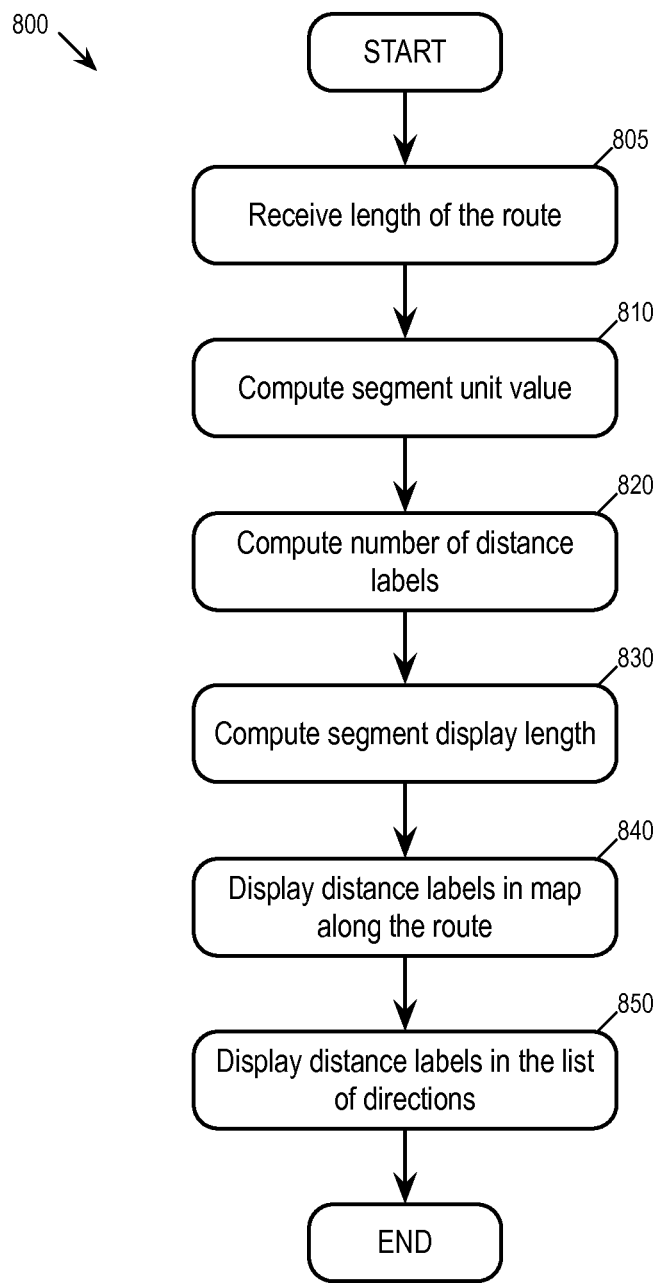
FIG. 8 conceptually illustrates a process of some embodiments for determining the placement of the distance labels along a route.

FIG. 8 conceptually illustrates a process 800 of some embodiments for determining the placement of the distance labels along a route. In some embodiments, a mapping application that displays the distance labels performs the process 800 (e.g., the mapping application described above by reference to FIGS. 6-7). In some embodiments, the process 800 starts whenever the mapping application has computed a route with a list of directions. In some embodiments, the process 800 starts whenever the zoom level of the map changes.

The process 800 starts by receiving (at 805) the length of the route. The length of the route is computed from the coordinates of various elements of the route in some embodiments. In some embodiments, the placement of the distance labels is based on the total length of the route, and the received length of route is the total length of the route, regardless of zoom level. In some embodiments, the placement of the distance labels is based on the portion of the route being displayed under the current zoom level, and the received length of the route is the length of the route being displayed currently.

The process then computes (at 810) the segment unit value, and computes (at 820) the number of distance labels to display along the route. Some embodiments adjust the segment unit value based on the received length of the route in order to limit the number of distance labels to a target number (e.g., to four distance labels/five segments). In some embodiments, the segment unit value is computed in order to achieve a target number of distance labels, each distance label having a distance measure that is a multiple of a "nice round number".

Figure 9:
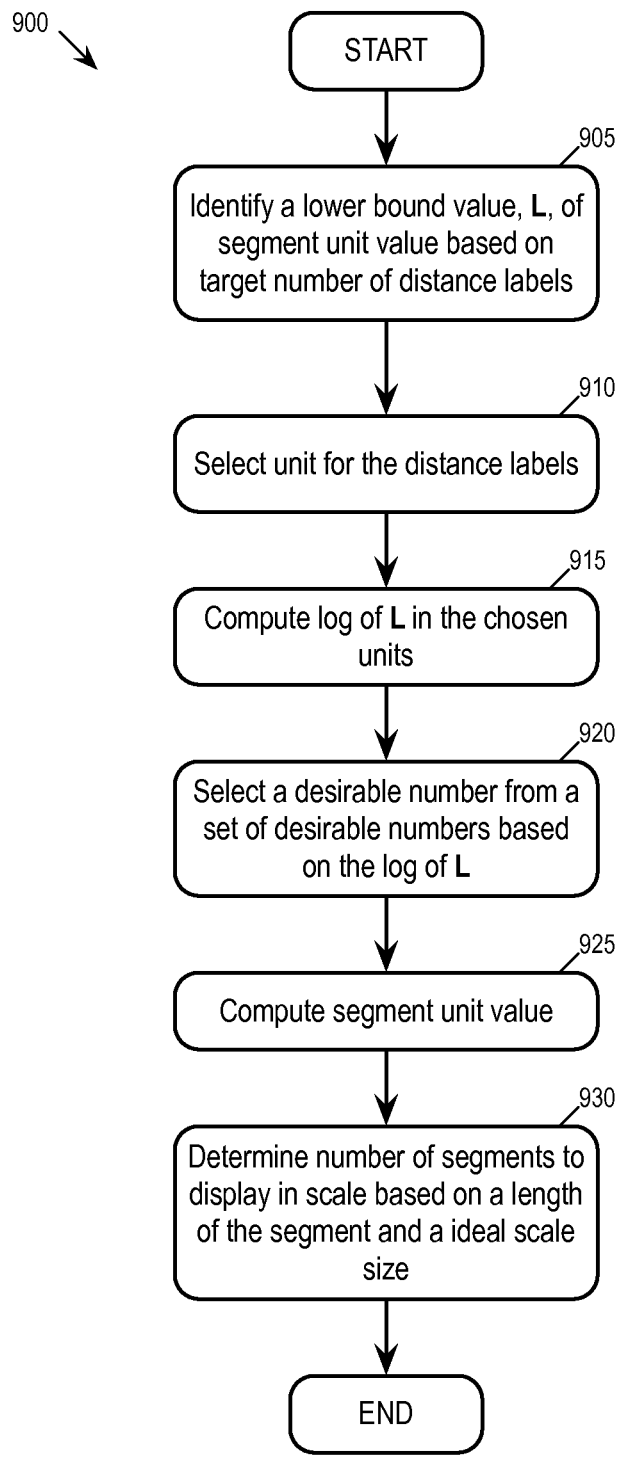
FIG. 9 illustrates a process for computing a desirable segment unit value as well as a suitable number of segments for the placement of distance labels along the route.

The computation of the number of distance labels as well as segment unit value will be further described below by reference to FIG. 9.

Next, the process 800 computes (at 830) the segment display length for the particular zoom level that accurately represents the distance of the computed segment unit value on the map. As mentioned, the segment display length is the length of the segment as displayed on the screen of the device. In order to compute the segment display length, the process 800 determines the distance that is represented by a particular unit (e.g., 1 cm, 2 cm, etc.) on the display of the device. The process 800 then calculates the segment display length in order to provide a length that represents the segment unit value that was calculated for the particular zoom level. For example, if 1 cm distance on the screen represents 1.2 miles at the current zoom level, the segment display length of a segment having a segment unit value of 1 mile would be approximately 0.833 cm on the screen of the device.

After determining the placement of the distance labels along the route in the map, the process displays (at 840) the distance labels along the route according to the computed number of distance labels and segment display length. The process then displays (at 850) the distance labels in the list of directions by associating each distance label to a nearest (distance wise) maneuver or step in the list of directions. In some embodiments, if multiple distance labels are associated with a particular maneuver in the list of directions (e.g., when the particular maneuver represents a long stretch of the highway without turns), the mapping application would display only one distance label for that maneuver. After displaying the distance labels, the process 800 ends.

As mentioned, the number of distance labels and the segment unit value are contingent upon computing a nice round number that is suitable to serve as the segment unit value. FIG. 9 illustrates a process 900 for computing a desirable segment unit value as well as a suitable number of segments for the placement of distance labels along the route.

The process 900 initially identifies (at 905) a lower bound value L of the segment unit value based on a target number of distance labels. Some embodiments compute this lower bound number by dividing the length of the route by the target number of segments corresponding to the target number of distance labels. For example, as mentioned, some embodiments limit the number of distance labels to up to 4 (thus the target number of segments is 5). Thus, for a route that is 7995 meters long, the process would divide the route length by 5 and produce a lower bound number 1599 meters. This value is typically not a desirable number and thus the process will re-adjust the segment unit value according to a new desirable number value that gets computed (at the end of process) for the segment (e.g., 1000 meters, 1 km, 5 km, etc.).

The process 900 then selects (at 910) a unit for the distance labels. For example, in a metric system, the process determines whether to display the scale in meters or kilometers. In a U.S. customary system, the process would determine whether to display the scale in feet or miles. Continuing with the example, the process may determine to display the 1599 meters in units of "kilometers" with 1 km=1000 meters. In some embodiments, the process may also analyze the locale of the region of the map to determine an appropriate unit measurement. For instance, if the mapping application is in use in Europe, the mapping application may apply the metric system, whereas a device in the U.S. may apply the U.S. standard system.

The process then computes (at 915) a log of the lower bound L (e.g., log(L)) in the chosen units of the lower bound to obtain a number X. The number X includes an integer portion I and a fractional portion f. In some embodiments, the log may be a base 10 logarithm. In other embodiments, a different base may be used (e.g., 2 or the natural log, etc.). Continuing with the example, computing log (1599 meters*1 km/1000 meters=1.599 km)=(approx.) 0.2038484637. Thus the integer portion I=0 and the fractional portion f=(approx.) 0.203.

The process then selects (at 920) a desirable number based on the log of the lower bound L. Some embodiments compare the fractional portion f of the log of L to a set of numbers N and selects the smallest number N' that is larger than f from the set N. The set of numbers N are computed as the log of a set of desirable numbers n. For example, the set of desirable values n could be 1.25, 2.5, 5 or 10, and the set of numbers N would then be {log(1.25), log(2.5), log(5), log(10)}, which equals approximately {0.0969, 0.3979, 0.6989, and 1}. Continuing with the example, the value of log(2.5)=0.3979 is the smallest number of the set N that is larger than the fractional portion f=(0.203). Thus, the process selects for N' the value of log(2.5), whose corresponding desirable number n' from the set n is 2.5.

The process then computes (at 925) the segment unit value by using the selected desirable number. In some embodiments, the process computes $10^{(I+N')}$ or $10^{I}*n'$ to obtain the segment unit value for a segment. Following the above example, where the lower bound value L is 1599 meters and I=0 and n'=2.5 (selected by fractional portion f=0.203), the scale segment would have a segment unit value of 2.5 km per segment, and the desired scale with a unit of measurement in kilometers.

Having computed the segment unit value of a segment for the scale, the process 900 then determines (at 930) the number of segments to display in the scale based on length of the route and the segment unit value. In some embodiments, the process 900 determines the number of segments to display along the route by using the following series of computations.

The process 900 first determines how many segments at segment unit value will fit into the length of the route. The process 900 then determines whether the number of segments that will fit into the length of route is less than or greater than 4.5 segments (since the target number of segments is five). The process 900 then rounds the number to the nearest integer number, such that a number of segments less than 4.5 segments rounds to 4 and a number of segments greater than (or equal to) 4.5 rounds to 5. For example, if the mapping application determines that 4.4 segments fit within the length of the route, the application rounds the 4.4 segments down and only displays 3 distance labels (i.e., 4 segments) along the route on the map. If the mapping application determines that 4.8 segments fit within the length of the route, the process rounds the 4.8 segments up and displays 4 distance labels (i.e., 5 segments) along the route on the map.

In some embodiments, the distance labels are placed such that a section of a route with more maneuvers is more likely to have a distance label, while a section of the route with fewer maneuvers is less likely to have a distance label. Placing distance labels in such a fashion allows a traveler to quickly realize whether he is in a section of the route with a lot of maneuvers, or if he is in a section of the route with very few maneuvers. For example, most routes have many maneuvers near the start and the destination but relatively few maneuvers in between. Some embodiments therefore place more distance labels near the start and end of the route where there are many maneuvers, and fewer distance labels in the middle stretch where there are fewer maneuvers.

Figure 10:
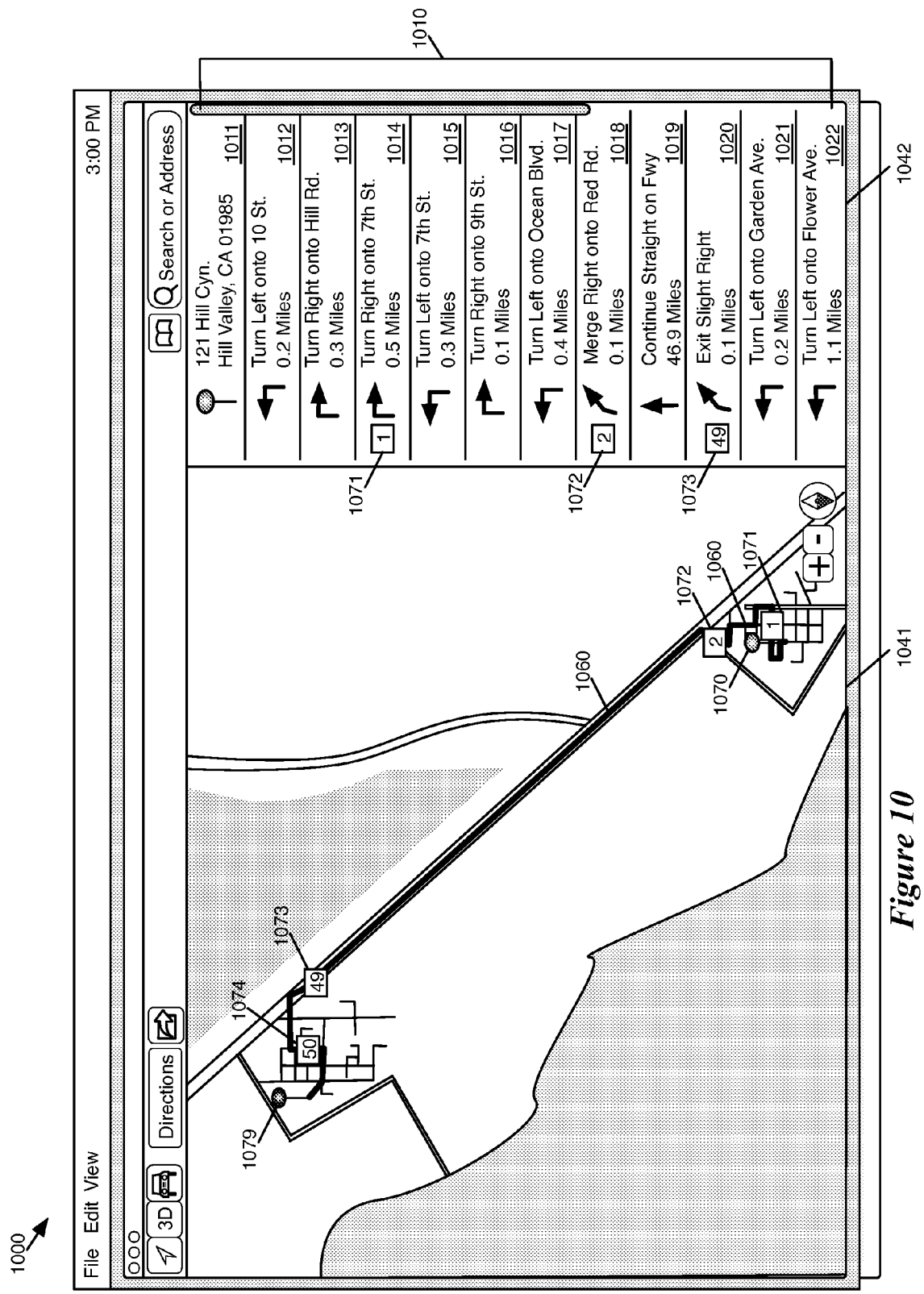
FIG. 10 illustrates the placement of distance labels based on where the maneuvers are in the route.

For some embodiments, FIG. 10 illustrates the placement of distance labels based on where the maneuvers are in the route. FIG. 10 illustrates a GUI 1000 of a computing device running a mapping application that is similar to the GUI 700 of FIG. 7. Like the GUI 700, the GUI 1000 also has a 2D map window 1041 for displaying a route 1060 and a pane 1042 for displaying a list of directions 1010. The mapping application has already computed the route 1060 from a point of origin 1070 to a destination 1079. The mapping application has also generated the list of directions 1010 based on the computed route 1060.

As illustrated, the mapping application has placed distance labels 1071-1074 along the route 1060. Toward the origin of the route lie the distance labels 1071 (1 mile) and 1072 (2 mile), as there are many turns near the origin (as can be seen by the maneuver items 1011-1018 near the start of the list of directions 1010). Likewise, toward the end of the route lie the distance labels 1073 (49 miles) and 1074 (50 miles), as there are many turns/maneuvers near the destination.

Some embodiments decide whether to place one of the fixed number of distance labels (e.g., 4) at any particular position along the route by determining how many maneuvers or steps are near that particular position. In some embodiments, the placement of the distance labels along a particular section of the route is determined by the number of maneuvers or steps within that section of the route. In other words, some embodiments distribute the distance labels based on the "density" of maneuvers along the route.

Some embodiments determine the placement of the distance labels along the route from the list of directions. The mapping application in some of these embodiments distributes the distance labels as evenly as possible among the maneuver items in the list regardless of the actual distances associated with the maneuvers. In some embodiments, the distribution of the distance labels is based on making the number of maneuvers between consecutive distance labels as even as possible. For example, some embodiments associate distance labels 1071-1074 with individual maneuvers in the list of directions 1010 so as to make the number of maneuvers between the distance labels 1071 and 1072 the same or nearly the same as the number of maneuvers between the distance labels 1072 and 1073, and the number of maneuvers between the distance labels 1072 and 1073 the same or nearly the same as the number of maneuvers between the distance labels 1073 and 1074, etc. Once the distance labels have been associated with individual maneuvers in the list of directions, the distance labels are introduced back to the route in the map based on the positions of the associated maneuvers.

Thus, a segment of the route between two consecutive maneuvers that are far apart in actual distance would not receive more distance labels than a segment of the route between two consecutive maneuvers that are close together in actual distance. For example, the segment associated with maneuver 1019, which is 46.9 miles long, would not have more distance labels than say, the segment associated with maneuver 1014, which is only 0.5 miles long. In such a manner, a short stretch of the route having more maneuvers would have more distance labels than a long stretch of the route with fewer maneuvers.

Figure 11:
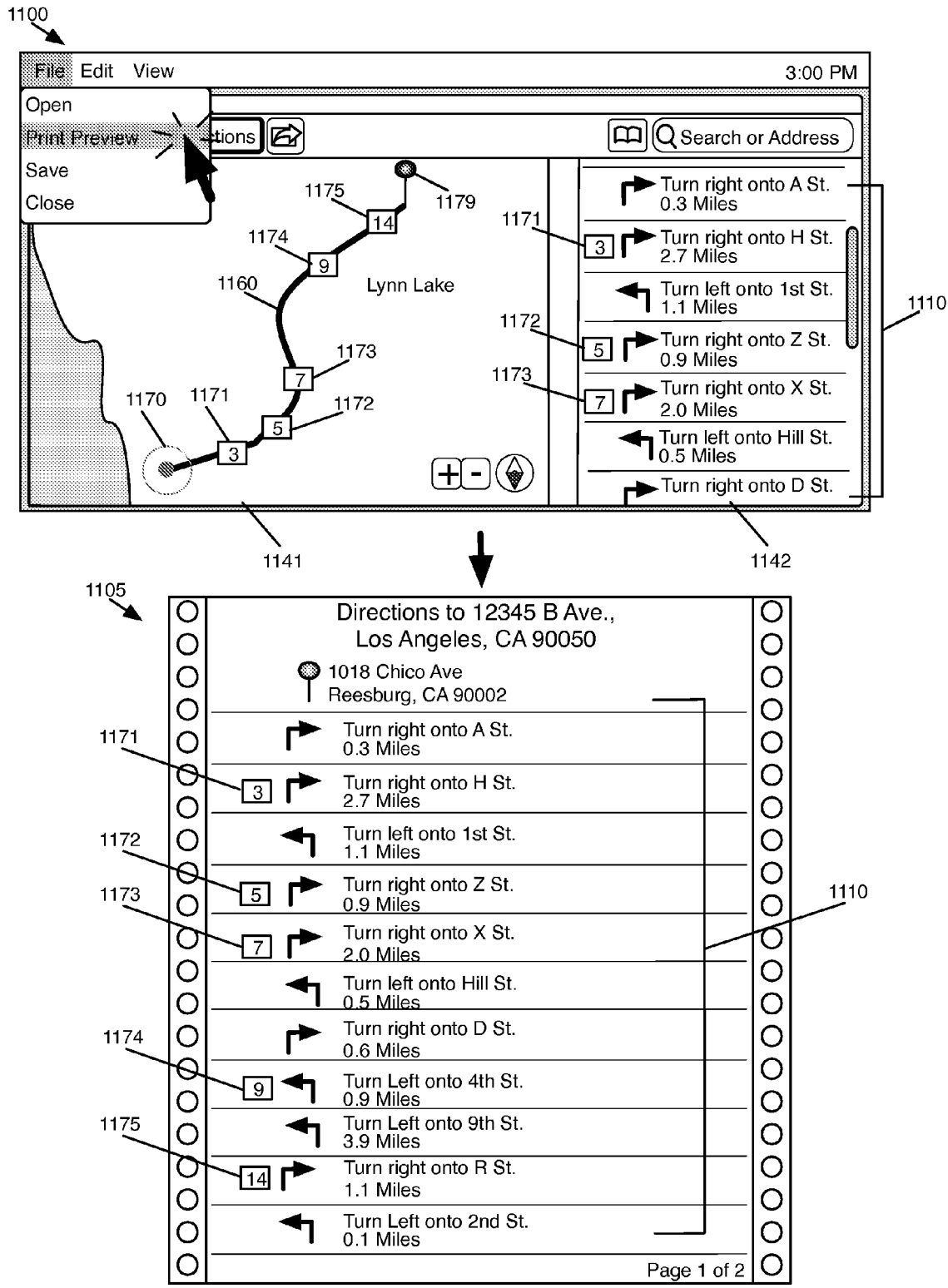
FIG. 11 illustrates a printed list of directions that includes distance labels.

In some embodiments, the mapping application outputs the list of directions to a printing device. In some of these embodiments, the distance labels are included in the printed list and placed next to some of the printed maneuver items. FIG. 11 illustrates a printed list of directions that includes distance labels.

FIG. 11 illustrates a GUI 1100 of a computing device running a mapping application that is similar to the GUI 700 of FIG. 7. Like the GUI 700, the GUI 1100 also has a 2D map window 1141 for displaying a route 1160 and a pane 1142 for displaying a list of directions 1110. The mapping application has already computed the route 1160 from a point of origin 1170 to a destination 1179. The mapping application has also generated the list of directions 1110 based on the computed route 1160.

The mapping application has placed 5 distance labels 1171-1175 along the route 1160 in the map window 1141 as well as along the list of directions 1110 in the pane 1142. The pane 1142 is configured to display at most seven maneuvers from the list of directions. As a result, only a subset of the list of directions is displayed, and only the distance labels associated with the displayed maneuvers are displayed in the pane 1142 (i.e., only 1171-1173).

FIG. 11 also illustrates the print out of the list of directions by the user (through the use of menu items at the top of the GUI 1100). The printing operation produced a print-out 1105, which includes the complete list of the directions 1110 and all of the distance labels 1171-1175.

Figure 12:
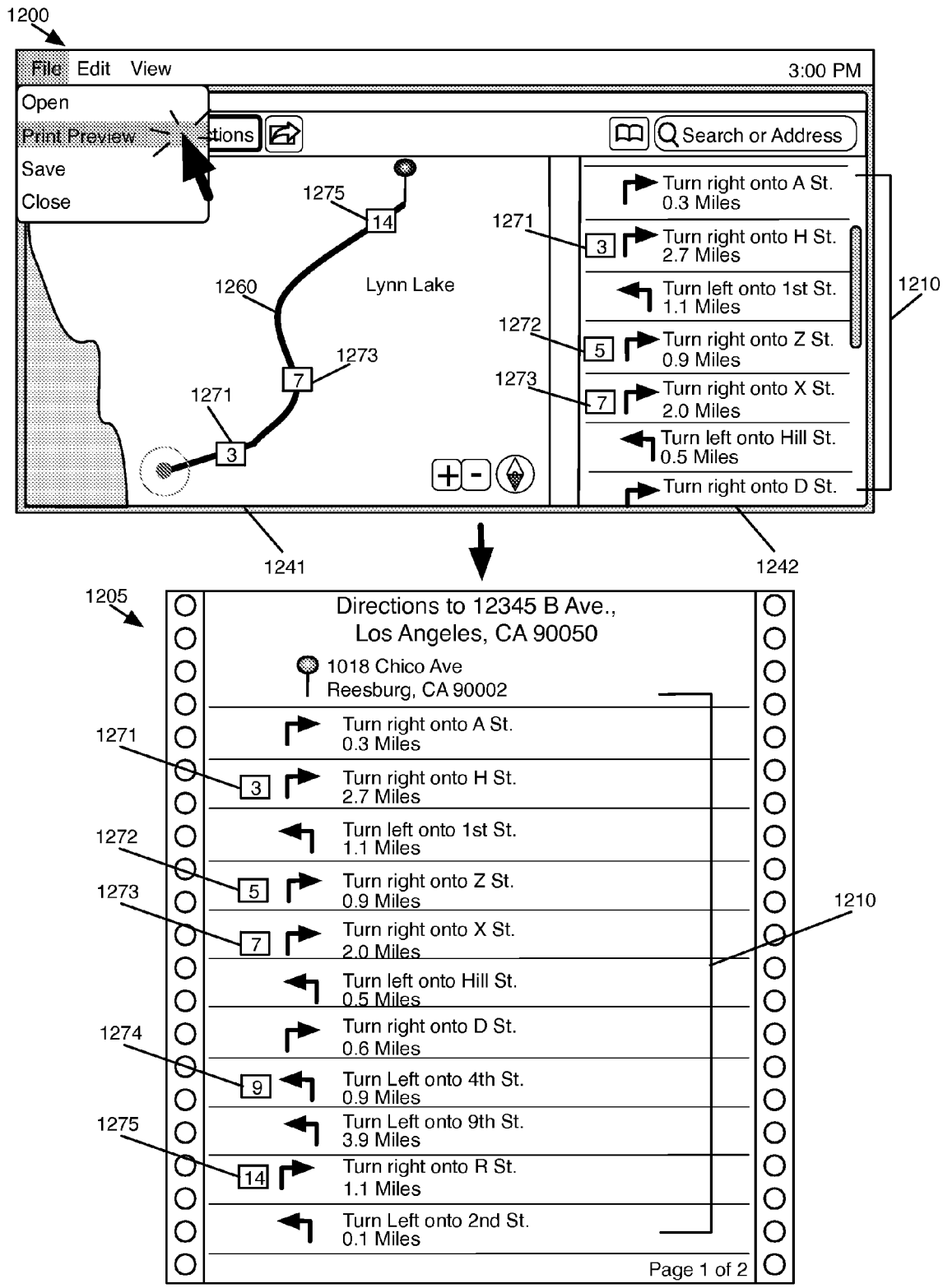
FIG. 12 illustrates a mapping application in which the distance labels along the route in the map window, along the list of directions, and in the print out are not the same.

In the example of FIG. 11, the set of distance labels being displayed along the route in the map window 1141, along the list of directions in the pane 1142, and in the print out 1105 are the same. However, in some embodiments, the set of distance labels in the map is not necessarily the same as the set of distance labels in the list of directions, and the set of distance labels in the print out is not necessarily the same as either the map or the list of directions. FIG. 12 illustrates a mapping application in which the distance labels along the route in the map window, along the list of directions, and in the print out are not the same. FIG. 12 illustrates a route 1260 in a map window 1241, a list of directions 1210 in a pane 1242, and a print-out 1205 of the list of directions 1210. The set of distance labels in the print out 1205 includes distance labels 1271 (3 mile), 1272 (5 mile), 1273 (7 mile), 1274 (9 mile), and 1275 (14 mile). The map window 1241, however, displays only distance label 1271 (3 mile), 1273 (7 mile), and 1275 (14 mile). The pane 1242 displays only a portion of the list of directions 1210, and hence displays only some of the distance labels (1271-1273), though the user can scroll the list of directions 1210 to view the rest (1274-1275).

Figure 13:
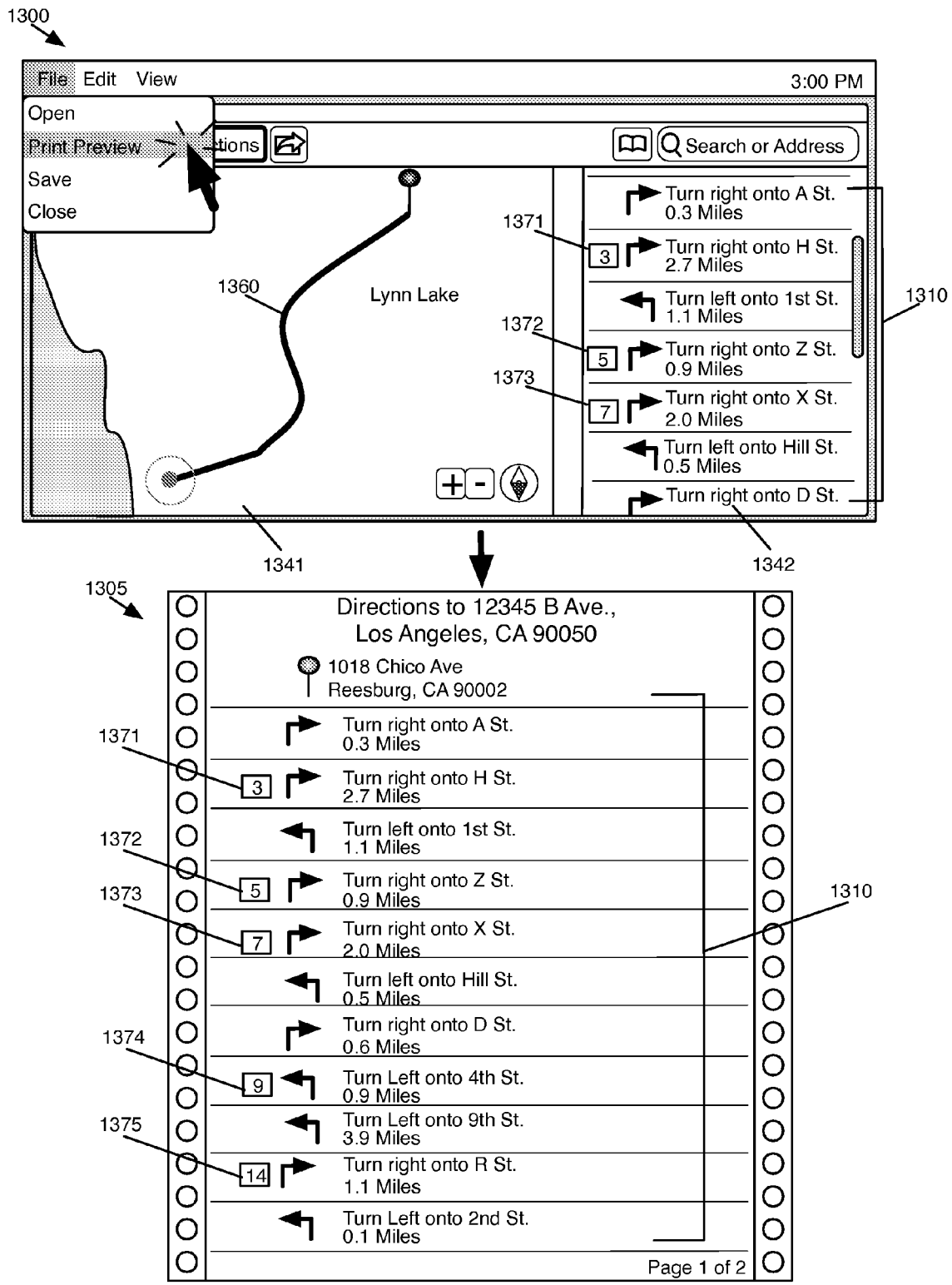
FIG. 13 illustrates a mapping application that displays distance labels only along a list of directions but not along a route in a map.
Figure 14:
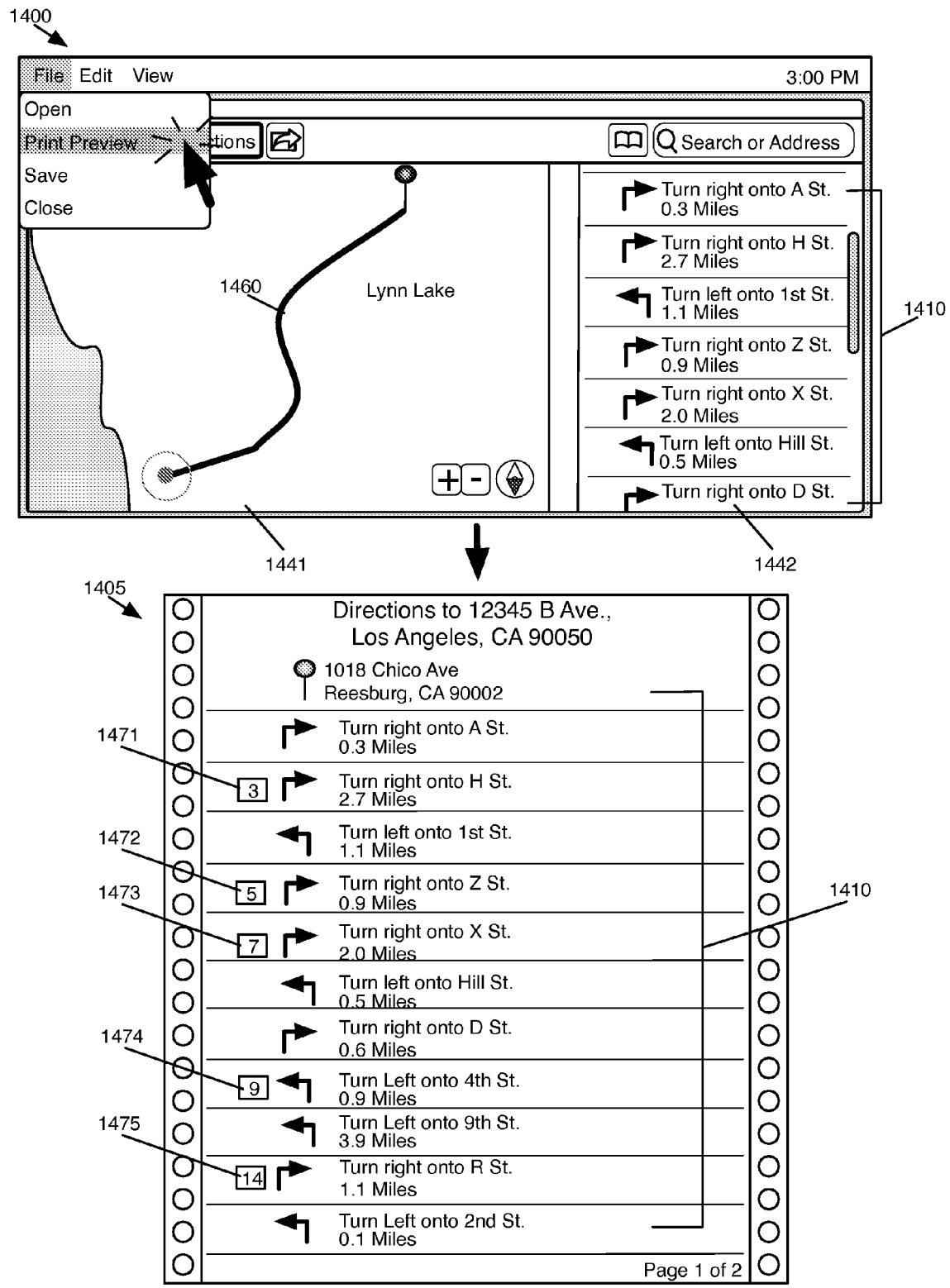
FIG. 14 illustrates a mapping application that includes distance labels along with a print-out of a list of directions but does not display distance labels at all in its GUI.
Figure 15:
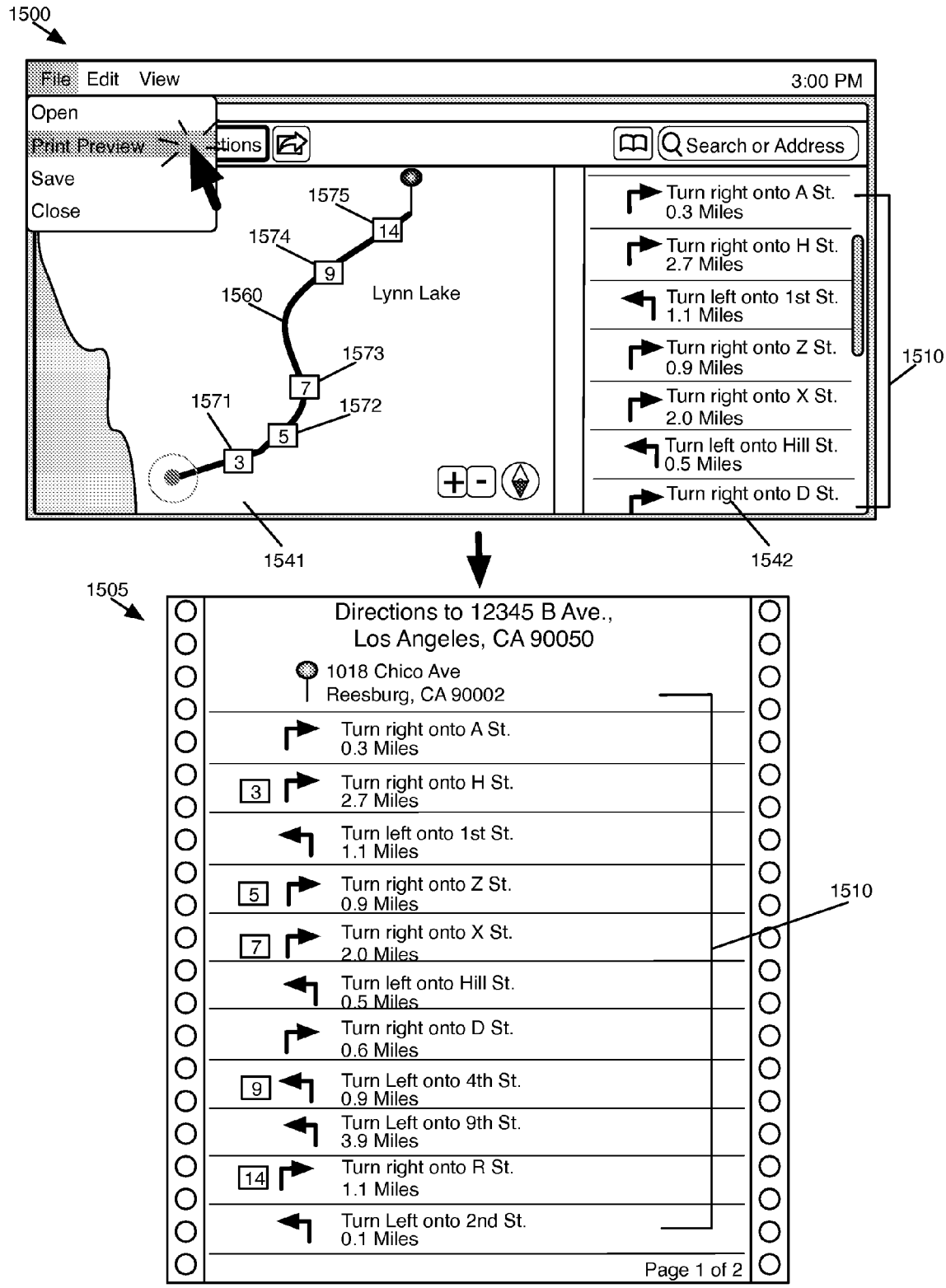
FIG. 15 illustrates a GUI of a mapping application that displays the distance labels along a route in a map window and includes the distance labels in a print-out of a list of directions, but does not display the distance labels along the list of directions within the GUI.

Some embodiments do not display distance labels along the route in the map or along the list of directions. FIG. 13 illustrates a GUI 1300 of a mapping application that displays distance labels 1371-1373 only along the list of directions 1310 in pane 1342 but not along the route 1360 in the map 1341. The distance labels 1371-1375 are printed along with the list of directions 1310 in the print-out 1305. FIG. 14 illustrates a mapping application that does not display distance labels at all in the GUI 1410 (not along the route 1460 in the map 1441 nor along the list of directions 1410 in pane 1442). The distance labels 1471-1475 are available only in the print-out 1405 of the list of directions 1410. FIG. 15 illustrates a mapping application that displays the distance labels 1571-1575 along the route 1560 in a map window 1541 of a GUI 1500 and includes the distance labels 1571-1575 in a print-out 1505 of a list of directions 1510. The mapping application, however, does not display the distance labels along the list of directions 1510 in the pane 1542 within the GUI 1500.

III. Changing the View of the Map by Selecting a Step in the List of Directions

In some embodiments, individual steps or maneuvers in the list of directions are selectable items in the GUI. The selection of a GUI item that corresponds to a particular maneuver in the list of directions causes the view of the map to move toward a location on the route that corresponds to the particular maneuver. When the user selects a new maneuver from the list of directions, some embodiments animate a transition from a previous view for a previously selected maneuver to a new view for the newly selected maneuver. In some embodiments, the transition includes zooming out to temporarily include both the previously selected maneuver and the newly selected maneuver before zooming in at the newly selected maneuver or step.

Figure 16:
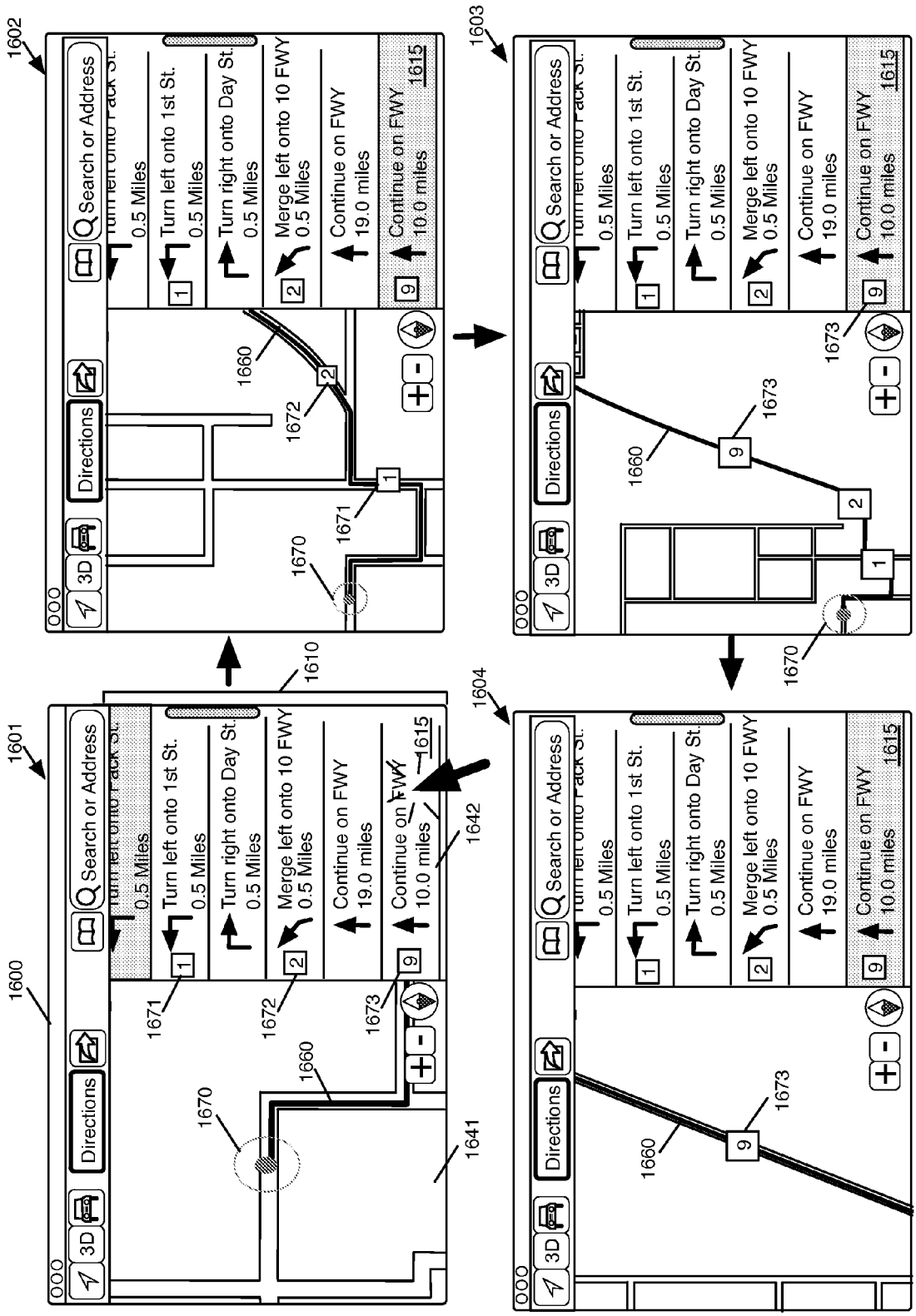
FIGS. 16-17 illustrate a mapping application that changes zoom level as it changes the view of the map due to the selection of a maneuver from a list of directions.

FIG. 16 illustrates a mapping application that changes the view of the map due to the selection of a maneuver from a list of directions. FIG. 16 illustrates a GUI 1600 of a computing device running the mapping application. Like the GUI 700 of FIG. 7, the GUI 1600 has a 2D map window 1641 for displaying a route 1660 and a pane 1642 for displaying a list of directions 1610. The mapping application has already computed the route 1660 from a point of origin 1670 to a destination (not shown). The mapping application has also generated the list of directions 1610 based on the computed route 1660. The mapping application has also generated distance labels 1671-1673, which are displayed along the route 1660 in the map window 1641 as well as along the list of directions in the pane 1642.

In four stages 1601-1604 of the GUI 1600, FIG. 16 illustrates changing the view of the map due to the selection of a maneuver items in the list of directions 1610. At the first stage 1601, the map window 1641 is centered on the point of origin 1670, which is also the current position of the mobile device. Since this is the point that is the currently the center of the map view of the mapping application, this is also the currently viewed position. The user is selecting an item 1615 in the list of directions 1610. The item 1615 corresponds to a maneuver that is not in the map window 1641 during stage 1601. Furthermore, positions along the route 1660 that correspond to distance labels 1671, 1672, and 1673 are not in map window 1641.

At the second stage 1602, the mapping application begins to change the view of the map by zooming out. The zooming out allows the map window 1641 to show positions along the route 1660 that correspond to distance labels 1671 (1 mile) and 1672 (2 mile). The original position 1670 is also being kept in view. However, the distance label 1673 (9 mile) (which is associated with the selected maneuver 1615) is still out of the view.

At the third stage 1603, the mapping application continues to zoom out until the original position 1670 and the selected maneuver 1615 (which corresponds to distance label 1673) are both in view of the map 1641.

Finally, at the fourth stage 1604, the mapping application zooms in on the position of the maneuver 1615 (and of the distance label 1673). The original location 1670 and distance labels 1671 and 1672 that were visible during stages 1602 and 1603 are no longer in view. In some embodiments, the new zoom level is based on the distance between the selected maneuver and its immediate neighboring maneuvers.

Figure 17:
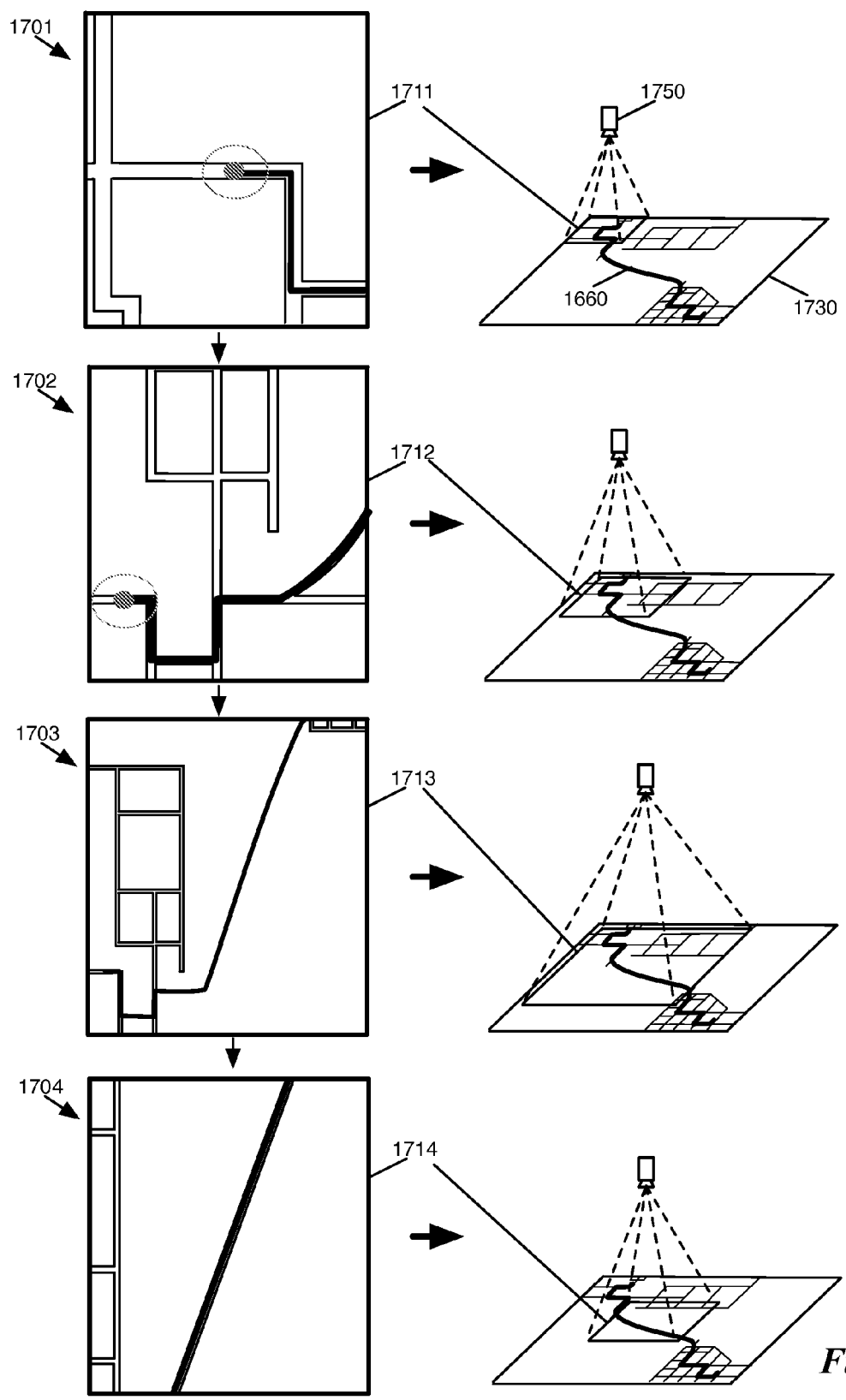

Some embodiments animate the transition between the different views of the map upon the selection of a maneuver item in the list of directions. In some embodiments, the animated transition can be based upon the movement of a virtual camera above the map. FIG. 17 conceptually illustrates the transition between different views of the map in FIG. 16 based on the movement of such a virtual camera. One of ordinary skill would understand that the introduction of the virtual camera is for conceptually explaining the movement of the view of the map. Some embodiments do not actually implement such a virtual camera.

FIG. 17 illustrates the movement of the virtual camera in four stages 1701-1704. Each stage illustrates a map view that is seen in the map window 1641 in the four stages 1601-1604 of FIG. 16. Each stage also illustrates a virtual camera 1750 hovering conceptually above a map surface 1730 that includes the entirety of the route 1660.

The first stage 1701 shows a map view 1711 that is seen in the map window 1641 during the stage 1601, which encompasses only the point of origin 1670. The stage shows the camera 1750 at a height over the map surface 1730 that corresponds to the zoom level of the map view 1711, as the camera is viewing a portion of the map surface 1730 that corresponds to the map view 1711.

The second stage 1702 shows a map view 1712 that is seen in the map window 1641 during the stage 1602, which encompasses the point of origin 1670 as well as distance labels 1671 and 1672. The stage shows the camera 1750 moving to a height over the map surface 1730 that corresponds to the zoom level of the map view 1712, as the camera is viewing a portion of the map surface 1730 that corresponds to the map view 1712.

The third stage 1703 shows a map view 1713 that is seen in the map window 1641 during the stage 1603, which encompasses the point of origin 1670, the distance labels 1671 and 1672, as well as the selected maneuver at distance label 1673. The stage shows the camera 1750 moving even higher to a height that corresponds to the zoom level of the map view 1713, as the camera is viewing a portion of the map surface 1730 that corresponds to the map view 1713.

The fourth stage 1704 shows a map view 1714 that is seen in the map window 1641 during the stage 1604, which encompasses only the selected maneuver at distance label 1673, but not the original point 1670 as well as the other distance labels 1671 and 1672. The stage shows the camera 1750 moving lower to a height that corresponds to the zoom level of the map view 1714, as the camera is viewing a portion of the map surface 1730 that corresponds to the map view 1714.

Figure 18:
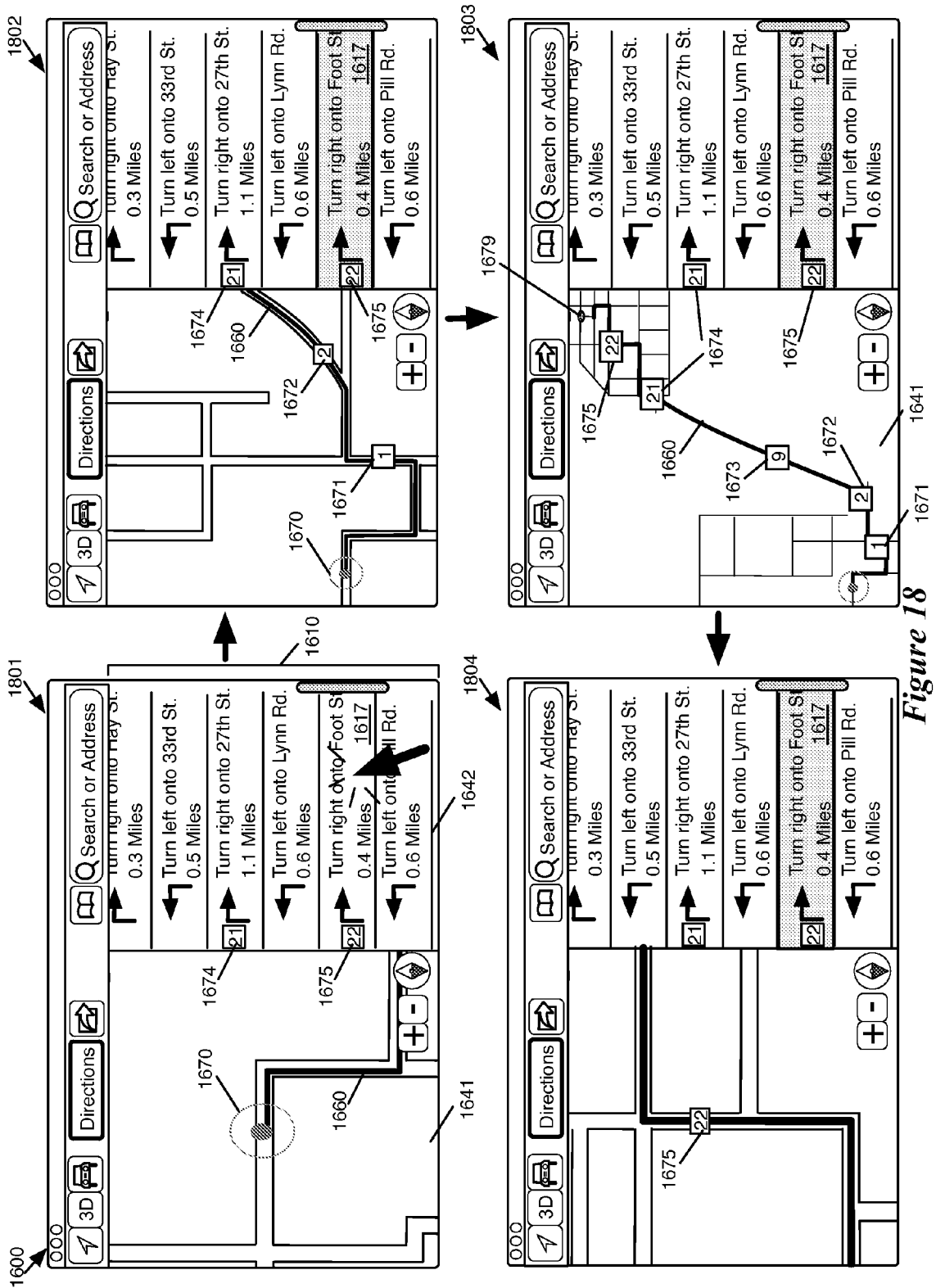
FIGS. 18-19 illustrate changing the view of the map due to the selection of a maneuver item that is far away from the original view.

The change of map view applies equally even when the original position and the position of the selected maneuver are far apart, such as when the original position is at the starting point of the route and the selected maneuver is at the destination of the route. FIG. 18 illustrates changing the view of the map due to the selection of a maneuver item that is far away from the original position. FIG. 18 shows the GUI 1600 of the computing device of the FIG. 16. As in FIG. 16, the mapping application has already generated the route 1660 and a corresponding list of directions 1610 for traveling to a destination point 1679. The mapping application has also generated distance labels 1671-1675, which are displayed along the route 1660 in the map window 1641 as well as along the list of directions in the pane 1642.

FIG. 18 shows the change in map view to a far-away maneuver in four stages 1801-1804. At the first stage 1801, the map window 1641 is centered on the point of origin 1670, which is also the current position of the mobile device. The user is selecting an item 1617 in the list of directions 1610. The item 1617 is associated with the distance label 1675 (22 miles). The item 1617 corresponds to a maneuver that is far away from the current position 1670 and not in the map window 1641 during the stage 1801. Furthermore, positions along the route 1660 that correspond to distance labels 1671-1675 are not in map window 1641.

At the second stage 1802, the mapping application begins to change the view of the map by zooming out. The zooming out allows the map window 1641 to show positions along the route 1660 that correspond to distance labels 1671 (1 mile) and 1672 (2 miles). The original position 1670 is also being kept in view. However, the distance label 1673 (9 miles), the distance label 1674 (21 miles), and distance label 1675 (22 miles) (which is associated with the selected maneuver 1617) are still out of the view.

At the third stage 1803, the mapping application continues to zoom out until both the original position 1670 and the selected maneuver 1617 (which correspond to distance label 1675 and is near the destination point 1679) are both in view of the map 1641. Because the selected maneuver is very close to the destination point 1679, the view of the map 1641 in fact encompasses the entire route 1660.

Finally, at the fourth stage 1804, the mapping application zooms in on the position of the maneuver 1617 (and of the distance label 1675). The original location 1670 and distance labels 1671-1674 that were visible during stage 1803 are no longer in view.

Figure 19:
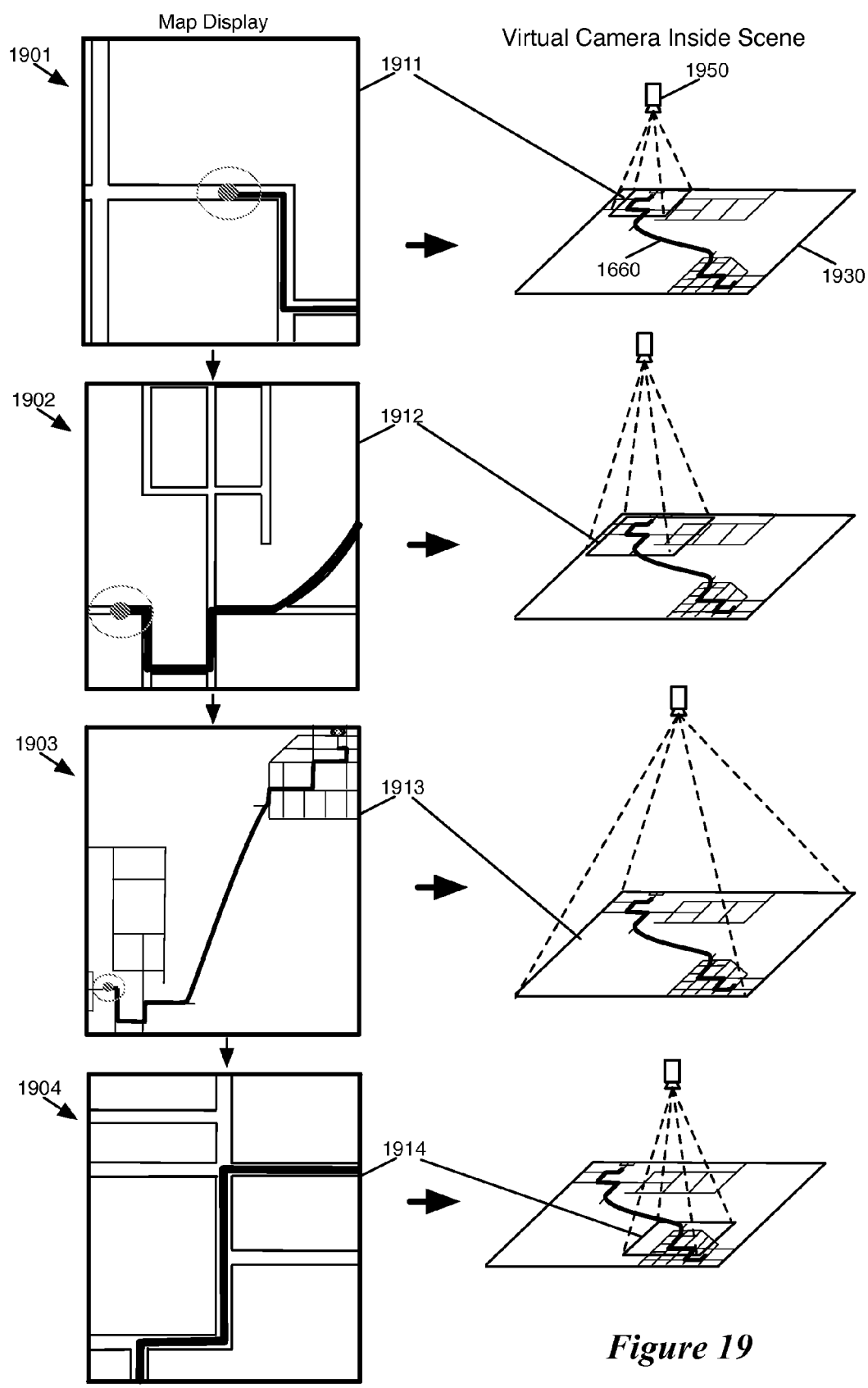

FIG. 19 conceptually illustrates the transition between the different views of the map in FIG. 18 based on the movement of a virtual camera 1950. FIG. 19 illustrates the movement of the virtual camera in four stages 1901-1904. Each stage illustrates a map view that is seen in the map window 1641 in the four stages 1801-1804 of FIG. 18. Each stage also illustrates the virtual camera 1950 hovering conceptually above a map surface 1930 that includes the entirety of the route 1660.

The first stage 1901 shows a map view 1911 that is seen in the map window 1641 during the stage 1801, which encompasses only the point of origin 1670. The stage shows the camera 1950 at a height over the map surface 1930 that corresponds to the zoom level of the map view 1911, as the camera is viewing a portion of the map surface 1930 that corresponds to the map view 1911.

The second stage 1902 shows a map view 1912 that is seen in the map window 1641 during the stage 1802, which encompasses the point of origin 1670 as well as distance labels 1671 and 1672. The stage shows the camera 1950 moving to a height over the map surface 1930 that corresponds to the zoom level of the map view 1912, as the camera is viewing a portion of the map surface 1930 that corresponds to the map view 1912.

The third stage 1903 shows a map view 1913 that is seen in the map window 1641 during the stage 1803, which encompasses the point of origin 1670, the distance labels 1671-1674, as well as the selected maneuver 1617 at distance label 1675. The stage 1903 shows the camera 1950 moving even higher to a height that corresponds to the zoom level of the map view 1913. Because the selected maneuver is very close to the destination point 1679, the map view 1913 in fact encompasses the entire route 1660. As a result, the camera 1950 is viewing the entirety of the map surface 1930.

The fourth stage 1904 shows a map view 1914 that is seen in the map window 1641 during the stage 1804, which encompasses only the selected maneuver at distance label 1675, but not the original point 1670, nor the other distance labels 1671-1674. The stage shows the camera 1950 moving lower to a height that corresponds to the zoom level of the map view 1914, as the camera is viewing a portion of the map surface 1930 that corresponds to the map view 1914.

Figure 20:
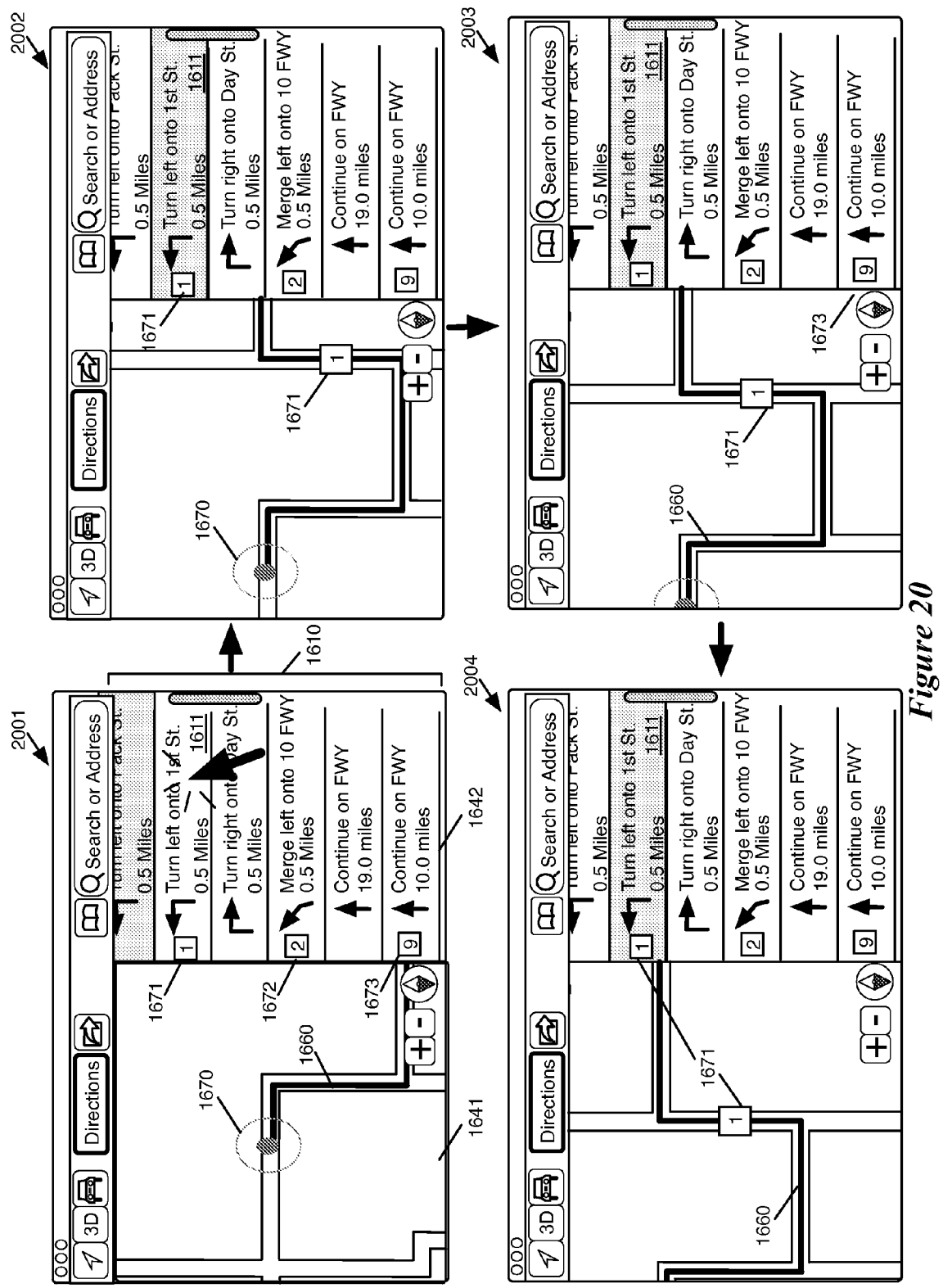
FIGS. 20-21 illustrate changing the view of the map due to the selection of a maneuver item that is near the original view.

In some embodiments, if the selected maneuver from the list of directions is sufficiently close to the current position being viewed, the selection of the maneuver would cause the view of the map to pan to the position of the selected maneuver but not zoom out. In some embodiments, this occurs when the current position and the new position of the selected maneuver can both be brought into view at the current zoom level. FIG. 20 illustrates changing the view of the map due to the selection of a maneuver item that is near the original view. FIG. 20 shows the GUI 1600 of the computing device of FIG. 16. As in FIG. 16, the mapping application has already generated the route 1660 and a corresponding list of directions 1610 for traveling to a destination point 1679. The mapping application has also generated distance labels 1671-1675, which are displayed along the route 1660 in the map window 1641 as well as along the list of directions in the pane 1642.

FIG. 20 shows the change in map view to a nearby maneuver in four stages 2001-2004. At the first stage 2001, the map window 1641 is centered on the point of origin 1670, which is also the current position of the mobile device. The user is selecting an item 1611 in the list of directions 1610, which is associated with distance label 1671 (1 mile). The item 1611 corresponds to a maneuver that is close to the current position 1670 but not yet in view of the map window 1641.

At the second stage 2002, the mapping application begins to change the view of the map by panning toward the position that corresponds to maneuver item 1611. As illustrated, by panning alone without zooming out, the map window 1641 is able to bring the selected maneuver item 1611 (which is associated with distance label 1671) into view while still keeping the original position 1670 in view.

At the third stage 2003, the mapping application continues to pan toward the selected maneuver 1611 (i.e., distance label 1671). The original position 1670 is gradually shifted out of view of the map window 1641. However, the map window 1641 is still at the same zoom level.

Finally, at the fourth stage 2004, the view of the map is centered at the position of the selected maneuver 1611 (and of the distance label 1671). The original location 1670 is no longer in view.

Figure 21:
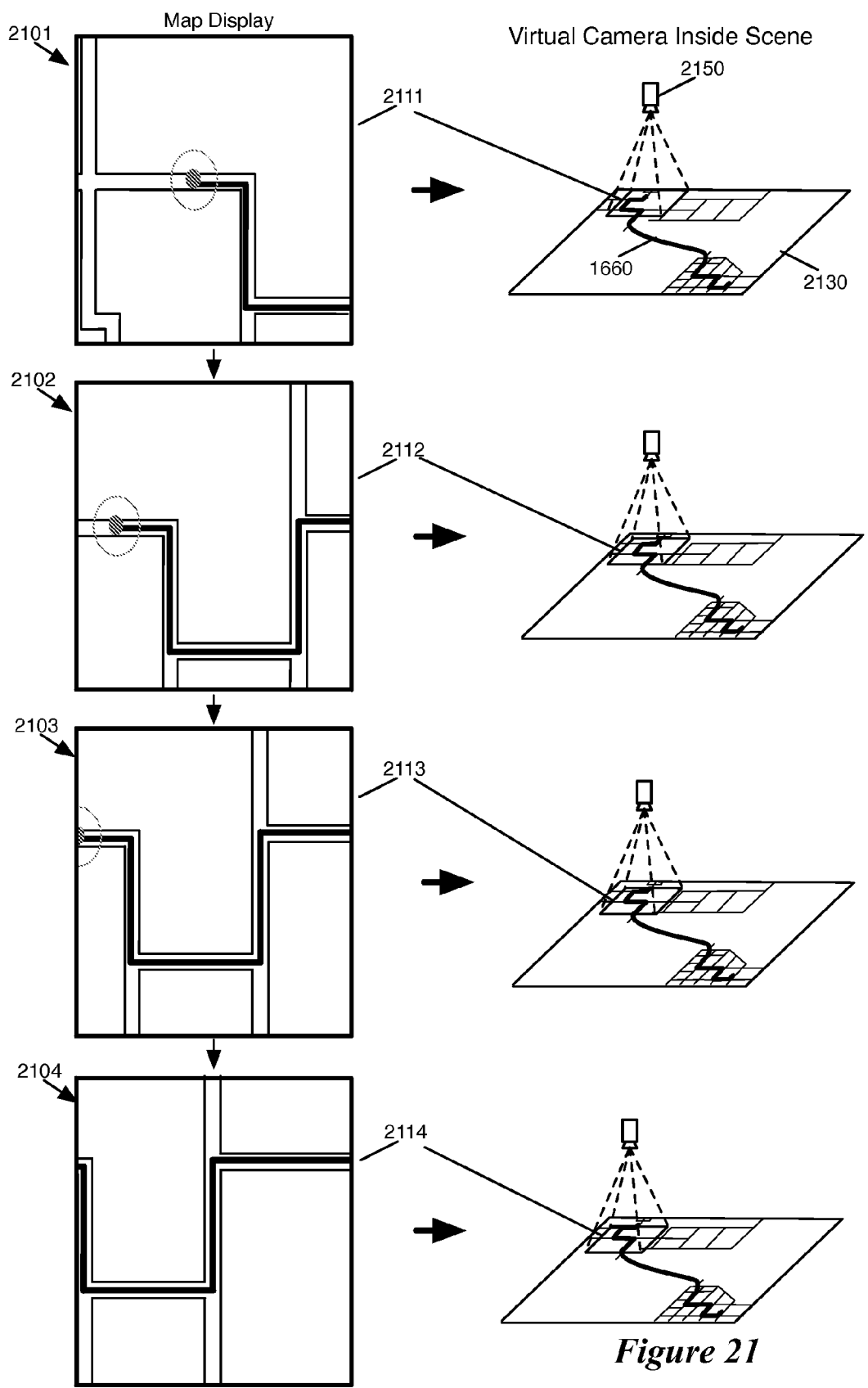

FIG. 21 conceptually illustrates the transition between the different views of the map in FIG. 20 based on the movement of a virtual camera 2150. FIG. 21 illustrates the movement of the virtual camera in four stages 2101-2104. Each stage illustrates a map view that is seen in the map window 1641 in the four stages 2001-2004 of FIG. 20. Each stage also illustrates the virtual camera 2150 hovering conceptually above a map surface 2130 that includes the entirety of the route 1660.

The first stage 2101 shows a map view 2111 that is seen in the map window 1641 during the stage 2001, which encompasses only the point of origin 1670. The stage shows the camera 2150 at a height over the map surface 2130 that corresponds to the zoom level of the map view 2111, as the camera is viewing a portion of the map surface 2130 that corresponds to the map view 2111.

The second stage 2102 shows a map view 2112 that is seen in the map window 1641 during the stage 2002, which encompasses the point of origin 1670 as well as the distance labels 1671. The stage shows the camera 2150 remaining at the same height as it was in stage 2101. It is moving laterally as it pans toward the selected maneuver.

The third stage 2103 shows a map view 2113 that is seen in the map window 1641 during the stage 2003. The camera 2150 continues its lateral movement toward the selected maneuver (at distance label 1671) and slowly panning away from the origin position 1670.

The fourth stage 2104 shows a map view 2114 that is seen in the map window 1641 during the stage 2004, which encompasses only the selected maneuver at distance label 1671, but not the original point 1670. The camera 2150 has completed its lateral movement to be above the selected maneuver, but it remains at the same height as it was in stage 2101 without change in zoom level.

Though not illustrated, once a mapping application has completed the view changing operation to the selected maneuver from the list of directions, the user can select another maneuver from the list of directions, and the mapping application would perform the same view changing operation toward the newly selected maneuver by treating the originally selected maneuver as the currently viewed position. Though each of the selected maneuvers in the examples of FIGS.

16-21 is associated with a distance label, some embodiments perform the same view changing operation regardless of whether the selected maneuver is associated with a distance label.

Figure 22:
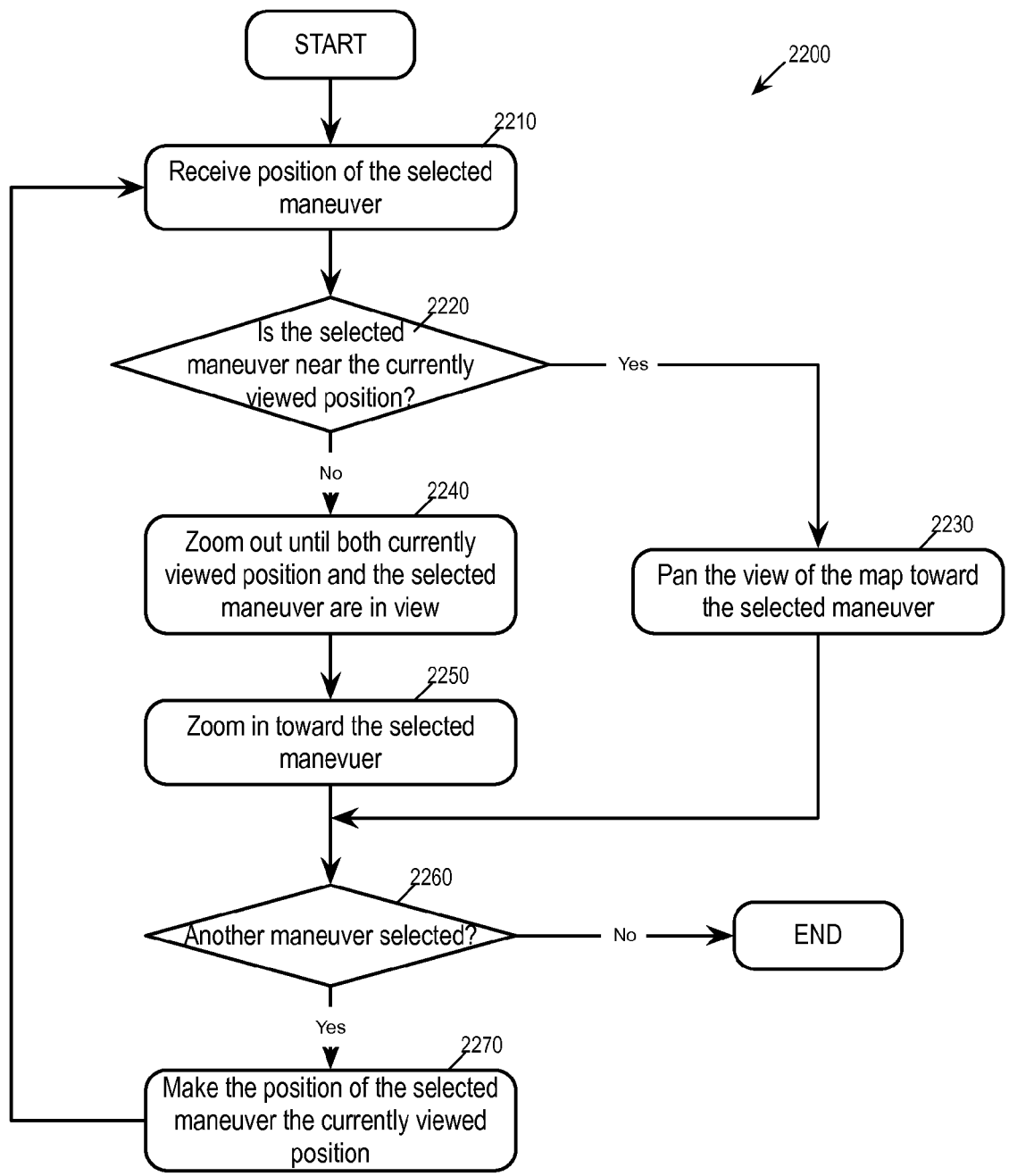
FIG. 22 conceptually illustrates a process for transitioning the view of the map when a maneuver in the list of directions is selected.

For some embodiments, FIG. 22 conceptually illustrates a process 2200 for transitioning the view of the map when a maneuver in the list of directions is selected. In some embodiments, the process 2200 is performed by a computing device when running a mapping application as described by reference to FIGS. 16-21. The process starts after a route has been computed and a list of directions based on the computed route has been generated, and the mapping application has provided a map and is viewing the map at a currently viewed position. This currently viewed position could be the current position of a traveler, a previously selected maneuver, or another position specified by the user to the mapping application.

The process 2200 receives (at 2210) the position of the selected maneuver. Based on the received position, the process determines (at 2220) whether the selected maneuver is near the currently viewed position. In some embodiments, a selected maneuver is determined to be "near" the currently viewed position if both the selected maneuver and the currently viewed position can fit into the map view at the current zoom level. If the selected maneuver is near the currently viewed position, the process proceeds to 2230. Otherwise the process proceeds to 2240.

At 2230, the process changes the view of the map toward the selected maneuver by performing a panning operation without changing the zoom level of the map. An example of such a panning operation is described above by reference to FIGS. 20-21. After performing the panning operation, the process proceeds to 2260.

At 2240, the process changes the view of the map by zooming out until both the currently viewed position and the selected maneuver are both in view. The process then zooms (2250) in toward the selected maneuver at a zoom level that is appropriate for the selected maneuver. The change of zoom level is described above by reference to FIGS. 16-19.

At 2260, the process determines whether another maneuver is selected from the list of directions. If so, the process makes (at 2270) the position of the selected maneuver the currently viewed position and returns to 2210. Otherwise, the process 2200 ends.

IV. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 23:
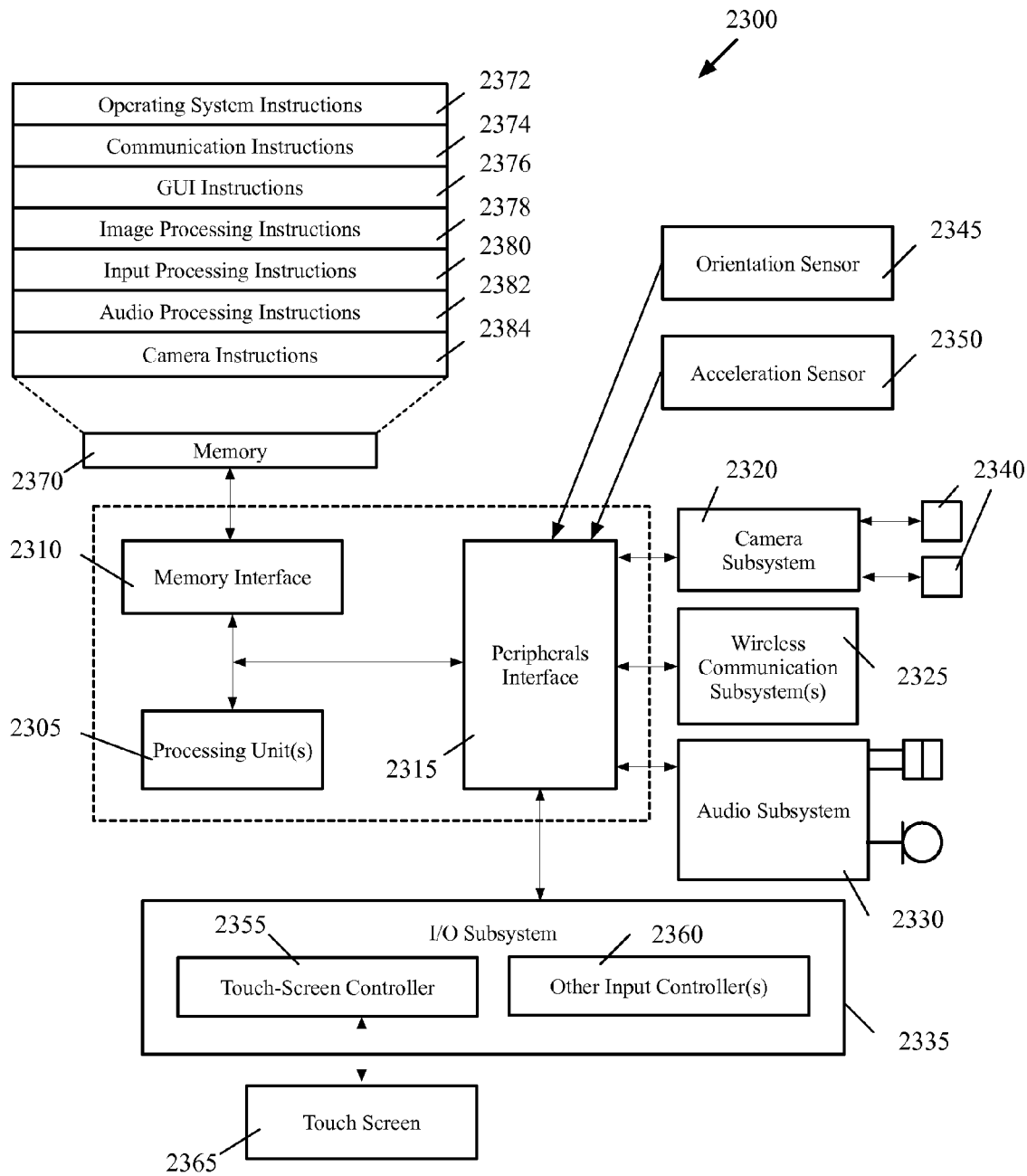
FIG. 23 is an example of an architecture of a mobile computing device of some embodiments.

The mapping and navigation applications of some embodiments operate on mobile devices, such as smart phones (e.g., iPhones®) and tablets (e.g., iPads®). FIG. 23 is an example of an architecture 2300 of such a mobile computing device. Examples of mobile computing devices include smartphones, tablets, laptops, etc. As shown, the mobile computing device 2300 includes one or more processing units 2305, a memory interface 2310 and a peripherals interface 2315.

The peripherals interface 2315 is coupled to various sensors and subsystems, including a camera subsystem 2320, a wireless communication subsystem(s) 2325, an audio subsystem 2330, an I/O subsystem 2335, etc. The peripherals interface 2315 enables communication between the processing units 2305 and various peripherals. For example, an orientation sensor 2345 (e.g., a gyroscope) and an acceleration sensor 2350 (e.g., an accelerometer) is coupled to the peripherals interface 2315 to facilitate orientation and acceleration functions.

The camera subsystem 2320 is coupled to one or more optical sensors 2340 (e.g., a charged coupled device (CCD) optical sensor, a complementary metal-oxide-semiconductor (CMOS) optical sensor, etc.). The camera subsystem 2320 coupled with the optical sensors 2340 facilitates camera functions, such as image and/or video data capturing. The wireless communication subsystem 2325 serves to facilitate communication functions. In some embodiments, the wireless communication subsystem 2325 includes radio frequency receivers and transmitters, and optical receivers and transmitters (not shown in FIG. 23). These receivers and transmitters of some embodiments are implemented to operate over one or more communication networks such as a GSM network, a Wi-Fi network, a Bluetooth network, etc. The audio subsystem 2330 is coupled to a speaker to output audio (e.g., to output voice navigation instructions). Additionally, the audio subsystem 2330 is coupled to a microphone to facilitate voice-enabled functions, such as voice recognition (e.g., for searching), digital recording, etc.

The I/O subsystem 2335 involves the transfer between input/output peripheral devices, such as a display, a touch screen, etc., and the data bus of the processing units 2305 through the peripherals interface 2315. The I/O subsystem 2335 includes a touch-screen controller 2355 and other input controllers 2360 to facilitate the transfer between input/output peripheral devices and the data bus of the processing units 2305. As shown, the touch-screen controller 2355 is coupled to a touch screen 2365. The touch-screen controller 2355 detects contact and movement on the touch screen 2365 using any of multiple touch sensitivity technologies. The other input controllers 2360 are coupled to other input/control devices, such as one or more buttons. Some embodiments include a near-touch sensitive screen and a corresponding controller that can detect near-touch interactions instead of or in addition to touch interactions.

The memory interface 2310 is coupled to memory 2370. In some embodiments, the memory 2370 includes volatile memory (e.g., high-speed random access memory), non-volatile memory (e.g., flash memory), a combination of volatile and non-volatile memory, and/or any other type of memory. As illustrated in FIG. 23, the memory 2370 stores an operating system (OS) 2372. The OS 2372 includes instructions for handling basic system services and for performing hardware dependent tasks.

The memory 2370 also includes communication instructions 2374 to facilitate communicating with one or more additional devices; graphical user interface instructions 2376 to facilitate graphic user interface processing; image processing instructions 2378 to facilitate image-related processing and functions; input processing instructions 2380 to facilitate input-related (e.g., touch input) processes and functions; audio processing instructions 2382 to facilitate audio-related processes and functions; and camera instructions 2384 to facilitate camera-related processes and functions. The instructions described above are merely exemplary and the memory 2370 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 23 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 23 may be split into two or more integrated circuits.

B. Computer System

Figure 24:
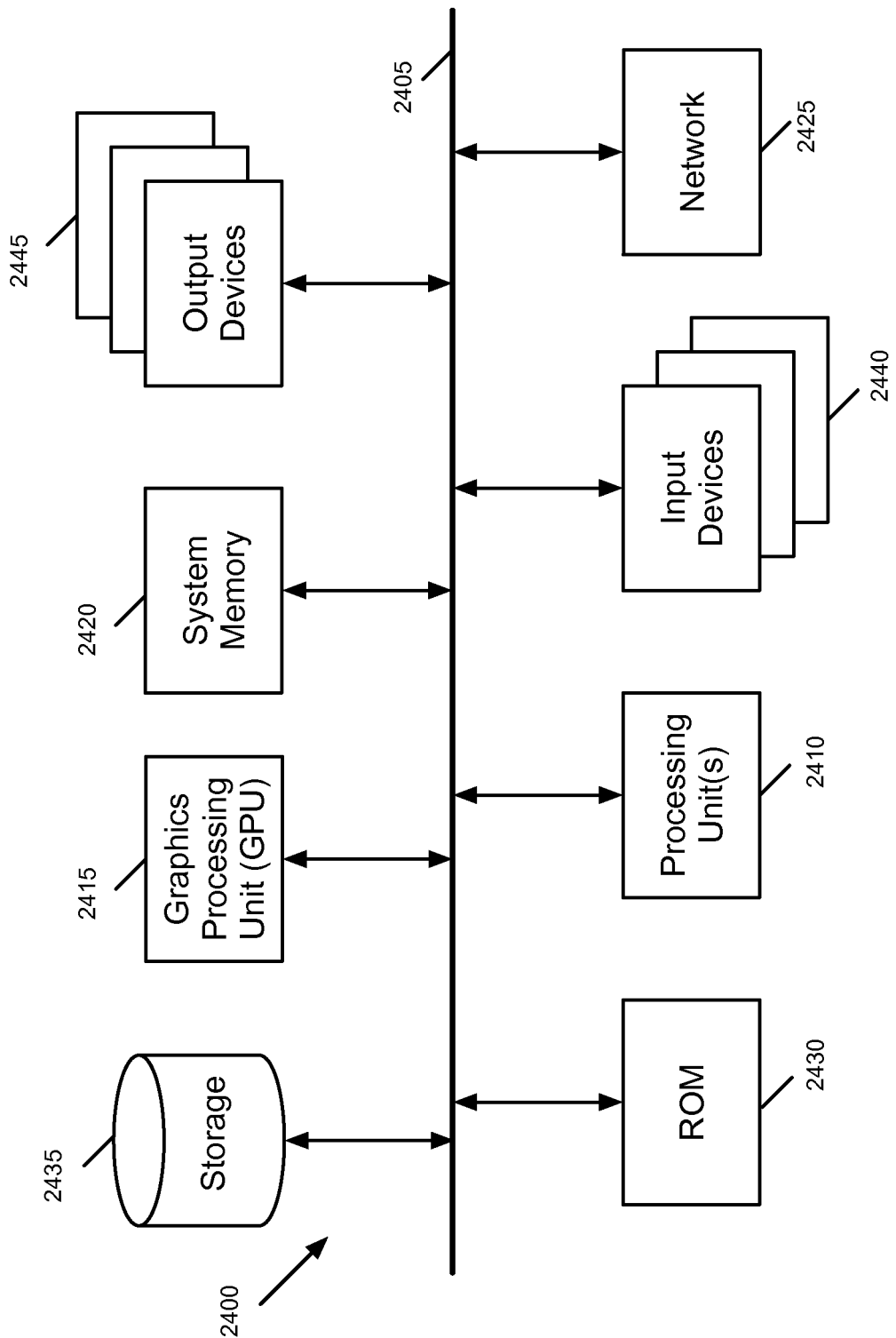
FIG. 24 conceptually illustrates an example of an electronic system with which some embodiments of the invention are implemented.

FIG. 24 conceptually illustrates another example of an electronic system 2400 with which some embodiments of the invention are implemented. The electronic system 2400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive, integrated flash memory) as the permanent storage device 2435.

Other embodiments use a removable storage device (such as a floppy disk, flash memory device, etc., and its corresponding drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet), or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 25:
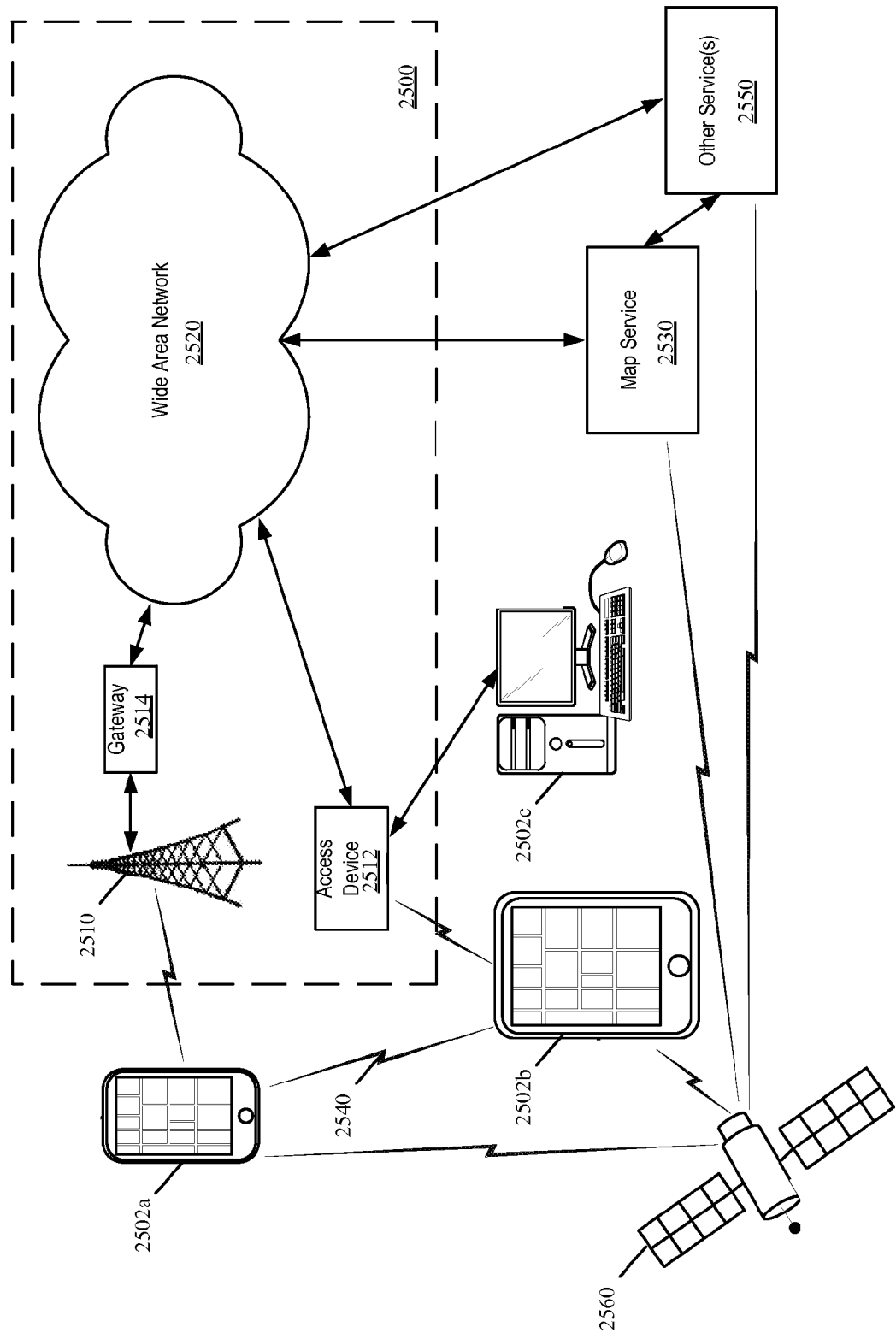
FIG. 25 illustrates a map service operating environment, according to some embodiments.

Various embodiments may operate within a map service operating environment. FIG. 25 illustrates a map service operating environment, according to some embodiments. A map service 2530 (also referred to as mapping service) may provide map services for one or more client devices 2502a-6202c in communication with the map service 2530 through various communication methods and protocols. A map service 2530 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 2502a-6202c may utilize these map services by obtaining map service data. Client devices 2502a-6202c may implement various techniques to process map service data. Client devices 2502a-6202c may then provide map services to various entities, including, but not limited to, users, internal software or hardware modules, and/or other systems or devices external to the client devices 2502a-6202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 2502a-6202c) are implemented on different portable-multifunction device types. Client devices 2502a-6202c utilize map service 2530 through various communication methods and protocols. In some embodiments, client devices 2502a-6202c obtain map service data from map service 2530. Client devices 2502a-6202c request or receive map service data. Client devices 2502a-6202c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 25 illustrates one possible embodiment of an operating environment 2500 for a map service 2530 and client devices 2502a-6202c. In some embodiments, devices 2502a, 2502b, and 2502c communicate over one or more wire or wireless networks 2510. For example, wireless network 2510, such as a cellular network, can communicate with a wide area network (WAN) 2520, such as the Internet, by use of gateway 2514. A gateway 2514 in some embodiments provides a packet oriented mobile data service, such as General Packet Radio Service (GPRS), or other mobile data service allowing wireless networks to transmit data to other networks, such as wide area network 2520. Likewise, access device 2512 (e.g., IEEE 802.11g wireless access device) provides communication access to WAN 2520. Devices 2502a and 2502b can be any portable electronic or computing device capable of communicating with a map service. Device 2502c can be any non-portable electronic or computing device capable of communicating with a map service.

In some embodiments, both voice and data communications are established over wireless network 2510 and access device 2512. For instance, device 2502a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 2510, gateway 2514, and WAN 2520 (e.g., using Transmission Control Protocol/Internet Protocol (TCP/IP) or User Datagram Protocol (UDP)). Likewise, in some implementations, devices 2502b and 2502c can place and receive phone calls, send and receive e-mail messages, and retrieve electronic documents over access device 2512 and WAN 2520. In various embodiments, any of the illustrated client devices may communicate with map service 2530 and/or other service(s) 2550 using a persistent connection established in accordance with one or more security protocols, such as the Secure Sockets Layer (SSL) protocol or the Transport Layer Security (TLS) protocol.

Devices 2502a and 2502b can also establish communications by other means. For example, wireless device 2502a can communicate with other wireless devices (e.g., other devices 2502b, cell phones, etc.) over the wireless network 2510. Likewise devices 2502a and 2502b can establish peer-to-peer communications 2540 (e.g., a personal area network) by use of one or more communication subsystems, such as Bluetooth® Device 2502c can also establish peer to peer communications with devices 2502a or 2502b (not shown). Other communication protocols and topologies can also be implemented. Devices 2502a and 2502b may also receive Global Positioning Satellite (GPS) signals from GPS satellites 2560.

Devices 2502a, 2502b, and 2502c can communicate with map service 2530 over one or more wired and/or wireless networks, 2512 or 2510. For instance, map service 2530 can provide map service data to rendering devices 2502a, 2502b, and 2502c. Map service 2530 may also communicate with other services 2550 to obtain data to implement map services. Map service 2530 and other services 2550 may also receive GPS signals from GPS satellites 2560.

In various embodiments, map service 2530 and/or other service(s) 2550 are configured to process search requests from any of the client devices. Search requests may include but are not limited to queries for businesses, addresses, residential locations, points of interest, or some combination thereof. Map service 2530 and/or other service(s) 2550 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2530 and/or other service(s) 2550 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2530 and/or other service(s) 2550, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2530 and/or other service(s) 2550 provide one or more feedback mechanisms to receive feedback from client devices 2502*a*-6202*c*. For instance, client devices may provide feedback on search results to map service 2530 and/or other service(s) 2550 (e.g., feedback specifying ratings, reviews, temporary or permanent business closures, errors etc.); this feedback may be used to update information about points of interest in order to provide more accurate or more up-to-date search results in the future. In some embodiments, map service 2530 and/or other service(s) 2550 may provide testing information to the client device (e.g., an A/B test) to determine which search results are best. For instance, at random intervals, the client device may receive and present two search results to a user and allow the user to indicate the best result. The client device may report the test results to map service 2530 and/or other service(s) 2550 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A mobile device comprising:
   a set of processing units; and
   a machine readable medium storing a program for execution by at least one of the processing units, the program comprising:
      a positioning module for providing a physical position of the mobile device;
      a routing module for generating a list of directions for traveling on a route comprising a plurality of maneuvers from a starting location to an ending location; and
      a display module for (i) displaying the list of directions as a plurality of graphical items, each graphical item representing a maneuver in the route, (ii) changing an appearance of a graphical item when the physical position of the mobile device indicates that a maneuver represented by the graphical item has completed, and (iii) maintaining the graphical item in display with its changed appearance for a predetermined period of time after the maneuver is executed before scrolling the list of directions.

2. The mobile device of claim 1, wherein the plurality of maneuvers comprises one or more notifications for traffic turns and one notification for the ending location.

3. The mobile device of claim 1, wherein a maneuver is a movement that a carrier of the mobile device is required to perform in order to continue traveling on the route.

4. The mobile device claim 1, wherein a maneuver is a driving direction.

5. The mobile device of claim 1, wherein the physical position of the mobile device is supplied by a global positioning system.

6. The mobile device of claim 1, wherein changing the appearance of the graphical item comprises making the graphical item less conspicuous than other graphical items in the list of directions.

7. A non-transitory computer readable medium storing a computer program for execution by at least one processor of a mobile device, the computer program comprising sets of instructions for:
   displaying a list of directions for traveling on a route from a starting location to an ending location, the route partitioned into a plurality of segments, the list of directions comprising a plurality of items representing the plurality of segments;
   altering an appearance of an item in the list of directions corresponding to a particular segment of the route when the mobile device is traveling along the particular segment; and
   maintaining the item in display with its altered appearance for a predetermined period of time after a maneuver associated with the particular segment is executed before scrolling the list of directions.

8. The non-transitory computer readable medium of claim 7, wherein each item in the list of directions displays a length of the segment represented by the item.

9. The non-transitory computer readable medium of claim 8, wherein the item corresponding to the particular segment includes a distance between a current position of the mobile device and a position of a step that terminates the particular segment.

10. The non-transitory computer readable medium of claim 7, wherein each item comprises a traffic maneuver that is required to continue traveling on the route.

11. The non-transitory computer readable medium of claim 7, wherein the set of instructions for altering the appearance of the item comprises a set of instructions for making the item less conspicuous than other items in the list of directions.

12. A non-transitory computer readable medium storing a computer program for execution by at least one processor of a mobile device, the computer program comprising sets of instructions for:
   displaying a list of directions for traveling on a route comprising a plurality of maneuvers from a starting location to an ending location, the list of driving directions comprising a plurality of graphical items, each graphical item representing a maneuver in the route; and
   updating the displayed list of directions according to a physical position of the mobile device, wherein said updating comprises:
      when the physical position of the mobile device has traveled past a particular maneuver in the route, altering an appearance of a graphical item in the list of directions that corresponds to the particular maneuver; and
      removing the graphical item that corresponds to the particular maneuver from the list of directions after the graphical item with the altered appearance has remained in display for a predetermined period of time after the particular maneuver is executed.

13. The non-transitory computer readable medium of claim 12, wherein the set of instructions for updating the displayed list of directions further comprises a set of instructions for adding new graphical items to the list of directions to represent maneuvers in the route that were not previously displayed as part of the list of directions.

14. The non-transitory computer readable medium of claim 12, wherein the set of instructions for updating the displayed list of directions is animated such that the removed graphical items disappear gradually from display and the added graphical items appear gradually into display.

15. The non-transitory computer readable medium of claim 12, wherein the set of instructions for altering the appearance of the graphical item comprises a set of instructions for making the graphical item less conspicuous than other graphical items in the plurality of graphical items.

16. A method comprising:
   displaying, at a mobile device, a list of directions for traveling on a route comprising a plurality of maneuvers from a starting location to an ending location, the list of directions comprising a plurality of graphical items representing the plurality of maneuvers;
   changing an appearance of a graphical item when the physical position of the mobile device indicates that a maneuver represented by the graphical item has completed; and
   maintaining the graphical item with its changed appearance in display for a predetermined period of time after the maneuver is executed before scrolling the list of directions.

17. The method of claim 16, wherein the plurality of maneuvers comprises one or more notifications for traffic turns and one notification for the ending location.

18. The method of claim 16, wherein a maneuver is a movement that a traveler carrying the mobile device is required to perform in order to continue traveling on the route.

19. The method claim 16, wherein a maneuver is a driving direction.

20. The method of claim 16, wherein the physical position of the mobile device is supplied by a global positioning system.

21. The method of claim 16, wherein changing the appearance of the graphical item comprises making the graphical item less conspicuous than other graphical items in the list of directions.

22. The method of claim 16, wherein the mobile device is performing a navigation operation based on the list of directions.

* * * * *